(12) United States Patent
Kim et al.

(10) Patent No.: US 10,201,048 B2
(45) Date of Patent: Feb. 5, 2019

(54) LIGHTING APPARATUS

(71) Applicant: SILICON WORKS CO., LTD., Daejeon (KR)

(72) Inventors: Yong Geun Kim, Suwon-si (KR); Ki Chul An, Daegu-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 15/228,080

(22) Filed: Aug. 4, 2016

(65) Prior Publication Data

US 2017/0048947 A1 Feb. 16, 2017

(30) Foreign Application Priority Data

Aug. 13, 2015 (KR) ........................ 10-2015-0114486

(51) Int. Cl.
H05B 37/00 (2006.01)
H05B 39/00 (2006.01)
H05B 41/00 (2006.01)
H05B 33/08 (2006.01)
H05B 37/02 (2006.01)

(52) U.S. Cl.
CPC ......... H05B 33/083 (2013.01); H05B 37/029 (2013.01); H05B 33/0809 (2013.01); H05B 33/0824 (2013.01); Y10T 307/453 (2015.04)

(58) Field of Classification Search
CPC .............. H05B 37/029; H05B 33/0824; H05B 33/083; H05B 33/0809; Y10T 307/453
USPC ........................ 315/191, 192, 185 R; 307/37
See application file for complete search history.

(56) References Cited

U.S. PATENT DOCUMENTS

| | | | | |
|---|---|---|---|---|
| 2010/0019687 A1* | 1/2010 | Komiya | .................... | G09G 3/14 315/291 |
| 2011/0084619 A1* | 4/2011 | Gray | .................. | H05B 33/0824 315/185 R |
| 2016/0007420 A1* | 1/2016 | Gong | ................. | H05B 33/0815 315/187 |

FOREIGN PATENT DOCUMENTS

| | | |
|---|---|---|
| CN | 103826366 | 5/2014 |
| CN | 103929866 | 7/2014 |
| CN | 203691702 | 7/2014 |
| KR | 10-2012-0069512 | 6/2012 |
| KR | 10-1141356 | 7/2012 |
| KR | 10-2013-0077592 | 7/2013 |
| KR | 10-1306740 | 9/2013 |
| KR | 10-1440350 | 9/2014 |
| KR | 10-2014-0137602 | 12/2014 |
| KR | 10-2014-0143050 | 12/2014 |
| KR | 10-2015-0002092 | 1/2015 |
| KR | 10-1521644 | 5/2015 |
| KR | 10-2015-0134251 | 12/2015 |

* cited by examiner

Primary Examiner — Anh Q Tran
(74) Attorney, Agent, or Firm — Kile Park Reed & Houtteman PLLC

(57) ABSTRACT

Disclosed is a lighting apparatus using an LED as a light source. The lighting apparatus may connect first and second lighting units in series or parallel according to a rectified voltage, change one or more of first and second driving currents corresponding to light emissions of the first and second lighting units, and have the universality for rectified voltages.

18 Claims, 14 Drawing Sheets

LIGHTING APPARATUS

BACKGROUND

1. Technical Field

The present disclosure relates to a lighting apparatus, and more particularly, to a lighting apparatus using an LED as a light source.

2. Related Art

A lighting apparatus is designed to use a light source which exhibits high light emission efficiency using a small amount of energy, in order to reduce energy consumption. Representative examples of a light source used in the lighting apparatus may include an LED. The LED is differentiated from other light sources in terms of various aspects such as energy consumption, lifetime, and light quality.

However, since the LED is driven by a current, a lighting apparatus using the LED as a light source requires a large number of additional circuits for driving a current. In order to solve the above-described problem, an AC direct-type lighting apparatus has been developed to provide an AC voltage to the LED.

The AC direct-type lighting apparatus is configured to convert an AC voltage into a rectified voltage, and drive a current using the rectified voltage such that the LED can emit light. Since the AC direct-type LED lighting apparatus uses a rectified voltage without using an inductor and a capacitor, the AC direct-type LED lighting apparatus has a satisfactory power factor. The rectified voltage indicates a voltage obtained by full-wave rectifying an AC voltage.

The AC direct-type lighting apparatus includes one or more LED groups, and each of the LED groups includes one or more LEDs, and emits light in response to a change of the rectified voltage.

The AC direct-type lighting apparatus may be configured to drive a plurality of LED groups using one or two or more driving circuits.

For example, when the plurality of LED groups are driven through two driving circuits, the plurality of LED groups may be controlled to sequentially emit light in response to changes of the rectified voltage.

More specifically, suppose that the AC direct-type lighting apparatus includes eight LED groups connected in series, and each of the two driving circuits drives four LED groups. At this time, suppose that an AC voltage of 220V is supplied to the AC direct-type lighting apparatus.

When a rectified voltage corresponding to the AC voltage of 220V is applied to the eight LED groups connected in series, the eight LED groups sequentially emit light in response to changes of the rectified voltage.

The electric power environment may differ in each country or region.

When the AC direct-type lighting apparatus is used in the electric power environment which supplies an AC voltage of 110V, the number of LED groups capable of emitting light using a rectified voltage corresponding to the AC voltage of 110V is limited. That is, when the electric power environment fails to satisfy the designed rated voltage of the lighting apparatus, the lighting apparatus emits light using a limited number of LED groups.

Therefore, the AC direct-type lighting apparatus needs to secure the universality for electric power environments such that the entire LED groups can be used for lighting, regardless of the electric power environments.

SUMMARY

Various embodiments are directed to a lighting apparatus using an LED, which has the universality for electric power environment.

Also, various embodiments are directed to a lighting apparatus which has the universality for electric power environment because the electrical connection state between lighting units included in the lighting apparatus can be changed to a parallel or serial connection state according to the state of a rectified voltage.

In an embodiment, a lighting apparatus may include: first and second lighting units comprising one or more LEDs and configured to emit light in response to a rectified voltage; a first driving circuit configured to provide a first current path corresponding to light emission of the first lighting unit and regulate a first driving current of the first current path; a second driving circuit configured to provide a second current path corresponding to light emission of the second lighting unit and regulate a second driving current of the second current path; and a driving current control circuit configured to change one or more of the first and second driving currents in response to the connection state between the first and second lighting units, and the first and second lighting units are electrically connected in series or parallel to each other.

DETAILED DESCRIPTION

Figure 1:
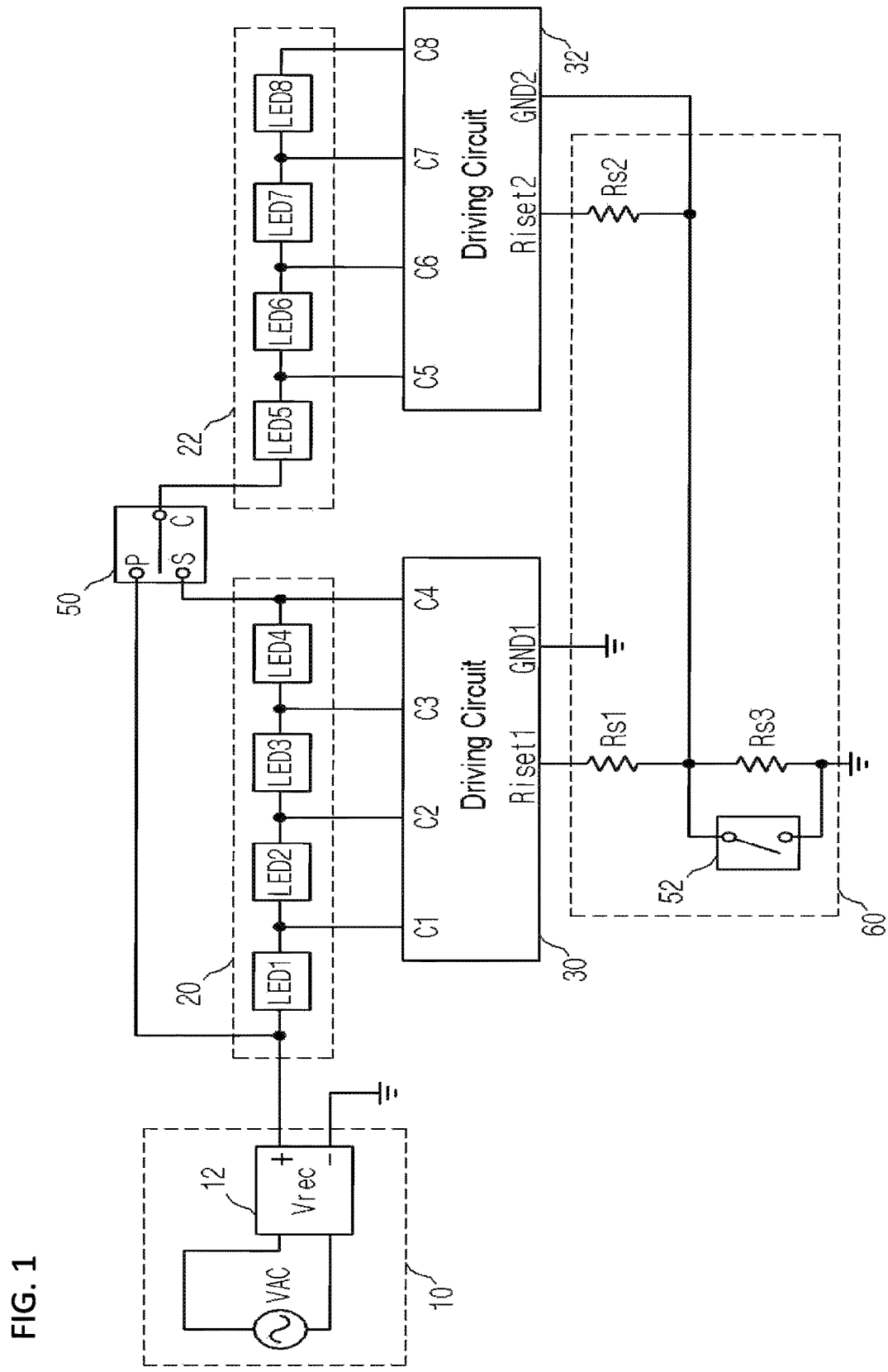
FIG. 1 is a block diagram illustrating a lighting apparatus according to an embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

The present invention may be embodied to control a driving current, in order to secure the universality for change of the electric power environment.

Thus, a lighting apparatus according to an embodiment of the present invention is configured to have the universality for lighting in different electric power environments such as the electric power environment for providing an AC voltage of 110V and the electric power environment for providing an AC voltage of 220V.

For this configuration, the lighting apparatus according to the present embodiment includes two lighting units, and is configured to change one or more of driving currents corresponding to operations of lighting units, in response to a connection state between the two lighting units. The lighting apparatus according to the present embodiment may include a driving current control circuit which is configured to change one or more of the driving currents. The two lighting units may include one or more LEDs, and be connected in series or parallel.

The lighting apparatus according to the present embodiment may include a switch for manually changing the electrical serial/parallel connection between the two lighting units and a switch for manually changing one or more of the driving currents.

The lighting apparatus according to the present embodiment may further include a voltage determination unit and a connection circuit. The voltage determination unit may divide a rectified voltage into first and second rectified voltages having different levels and provide a determination signal obtained by dividing the rectified voltage, and the connection circuit may electrically connect the lighting units in series or parallel to each other in response to a change of the determination signal. At this time, one or more of the driving currents of the driving circuits corresponding to the two lighting units may be changed in response to the change of the determination signal.

The driving current control circuit may reduce one or more of the driving currents. More desirably, the driving current control circuit may reduce the driving current of a lighting unit which first emits light between the lighting units connected in series.

The driving current control circuit may reduce the driving currents at an equal ratio or different ratios.

The driving current control circuit may reduce a part of the driving currents, and increase the other part of the driving currents. In this case, the driving current control circuit may reduce the driving current of the lighting unit which first emits light between the lighting units connected in series, and increase the driving current of the lighting unit which subsequently emits light.

When the lighting apparatus includes first and second lighting units, the driving current control circuit may change one or more of the first and second driving currents by controlling one or more of a first sensing resistance value of a first sensing resistor connected to a first current path of a first driving circuit corresponding to the first lighting unit, a second sensing resistance value of a second sensing resistor connected to a second current path of a second driving circuit corresponding to the second lighting unit, a first reference voltage which is applied to the first driving circuit in order to control the first current path, and a second reference voltage which is applied to the second driving circuit in order to control the second current path.

The above-described embodiments will be understood with reference to the accompanying drawings.

Referring to FIG. 1, the lighting apparatus according to the embodiment of the present invention includes a power supply unit 10, lighting units 20 and 22, driving circuits 30 and 32, a connection circuit 50 and a driving current control circuit. The driving current control circuit of FIG. 1 is configured to control a driving current by controlling a resistance value of a sensing resistor. For this operation, the driving current control circuit includes a sensing resistor circuit 60.

The power supply unit 10 may be configured to provide a rectified voltage Vrec. For this operation, the power supply unit 10 may include an AC power supply VAC and a rectifier 12. The AC power supply VAC may be implemented with a common AC power supply, and provide an AC voltage. For example, the AC power supply VAC may include a common AC power supply which provides an AC voltage of 110V or 220V. The rectifier 12 may full-wave rectify an AC voltage of the AC power supply VAC, and output the rectified voltage Vrec. The rectifier 12 may have a typical bridge diode structure.

The rectified voltage Vrec provided from the power supply unit 10 has a ripple corresponding to a half cycle of the AC voltage. When the rectified voltage Vrec provided from the power supply unit 10 corresponds to an AC voltage of 110V, the rectified voltage Vrec has a peak value corresponding to 110V, and when the rectified voltage Vrec corresponds to an AC voltage of 220V, the rectified voltage Vrec has a peak value corresponding to 220V. Hereafter, a change of the rectified voltage Vrec in the present embodiment is defined as an increase/decrease of the ripple.

The lighting units 20 and 22 emit light in response to the rectified voltage Vrec, and include LEDs. The plurality of LEDs included in the lighting units 20 and 22 may be divided into a plurality of LED groups, and FIG. 1 illustrates that each of the lighting units 20 and 22 includes four LED groups connected in series. That is, the lighting unit 20 includes LED groups LED1 to LED4 connected in series, and the lighting unit 22 includes LED groups LED5 to LED8 connected in series.

The number of LED groups included in each of the lighting units 20 and 22 may be set to various values according to a designer's intention.

Each of the LED groups included in the lighting units 20 and 22 may include one or more LEDs or a plurality of LEDs connected in series, parallel or series-parallel.

The electrical connection state between the lighting units 20 and 22 may be determined according to a switching state of the connection circuit 50. The connection circuit 50 may connect the lighting units 20 and 22 in series or parallel to each other.

The connection circuit 50 may include a switch for switching the connection state between the lighting units 20 and 22 to the parallel or serial connection state.

More specifically, the switch may include a parallel terminal P, a serial terminal S and a common terminal C. The parallel terminal P may receive the rectified voltage Vrec, the serial terminal S may be connected to an output terminal of the last LED group LED4 among the serially connected LED groups of the lighting unit 20, and the common terminal C may be connected to the first LED group LED5 among the serially connected LED groups of the lighting unit 22. The common terminal C may be connected to the parallel terminal P or the serial terminal S.

When the common terminal C and the parallel terminal P of the connection circuit 50 are connected to each other, the lighting units 20 and 22 are electrically connected in parallel to each other, and when the common terminal C and the serial terminal S of the connection circuit 50 are connected to each other, the lighting units 20 and 22 are electrically connected in series to each other.

When the level of the rectified voltage Vrec is not enough to sequentially turn on the entire LED groups of the lighting units 20 and 22 connected in series, the connection circuit 50 electrically connects the lighting units 20 and 22 in parallel to each other. In this case, the LED groups included in each of the lighting units 20 and 22 connected in parallel sequentially emit light in response to the changes of the rectified voltage Vrec.

On the other hand, when the level of the rectified voltage Vrec is enough to sequentially turn on the entire LED groups of the lighting units 20 and 22 connected in series, the connection circuit 50 electrically connects the lighting units 20 and 22 in series to each other. In this case, the entire LED groups LED1 to LED8 included in the lighting units 20 and 22 sequentially emit light in response to the changes of the rectified voltage Vrec.

The voltage at which an LED group emits light may be defined as a light emission voltage. More specifically, the voltage at which the LED group LED1 emits light may be defined as a light emission voltage V1 of the LED group LED1, the voltage at which the LED groups LED1 and LED2 emit light may be defined as a light emission voltage V2 of the LED group LED2, the voltage at which the LED groups LED1 to LED3 emit light may be defined as a light emission voltage V3 of the LED group LED3, and the voltage at which the LED groups LED1 to LED4 emit light may be defined as a light emission voltage V4 of the LED group LED4.

When the lighting units 20 and 22 are connected in series, the voltage at which the LED groups LED1 to LED5 emit light may be defined as a light emission voltage V5 of the LED group LED5, the voltage at which the LED groups LED1 to LED6 emit light may be defined as a light emission voltage V6 of the LED group LED6, the voltage at which the LED groups LED1 to LED7 emit light may be defined as a light emission voltage V7 of the LED group LED7, and the voltage at which the LED groups LED1 to LED8 emit light may be defined as a light emission voltage V8 of the LED group LED8.

The driving circuits 30 and 32 perform current regulation for light emission of the lighting units 20 and 22, and provide current paths for sequential light emission.

More specifically, the driving circuit 30 may be configured to provide a current path which is changed in response to light emissions of the LED groups LED1 to LED4 of the lighting unit 20 according to the changes of the rectified voltage Vrec, and perform current regulation on the current path.

For this operation, the driving circuit 30 includes terminals C1 to C4, a sensing resistor terminal Riset1 and a ground terminal GND1. The terminals C1 to C4 are connected to the respective output terminals of the LED groups LED1 to LED4 included in the lighting unit 20 and configured to form a channel, and the sensing resistor terminal Riset1 is configured to connect a current path formed in the driving circuit 30 to a sensing resistor.

The driving circuit 30 uses a sensing voltage provided through the sensing resistor terminal Riset1 in order to provide a current path.

The driving circuit 30 compares a sensing voltage to reference voltages which are internally provided in response to the respective LED groups LED1 to LED4. According to the comparison results between the sensing voltage and the reference voltages, the driving circuit 30 may provide current paths connecting the sensing resistor terminal Riset1 to the terminals C1 to C4, respectively.

The driving circuit 32 also includes terminals C5 to C8, a sensing resistor terminal Riset2 and a ground terminal GND2. The terminals C5 to C8 are connected to the respective output terminals of the LED groups LED5 to LED8 included in the lighting unit 22 and configured to form a channel, and the sensing resistor terminal Riset2 is configured to connect a current path formed in the driving circuit 32 to a sensing resistor. Since the operation of the driving circuit 32 to provide a current path is performed in the same manner as the driving circuit 30, the detailed descriptions thereof are omitted herein.

The driving circuits 30 and 32 may be configured to have the same reference voltages.

The driving circuits 30 and 32 may be implemented as one integrated circuit.

The lighting units 20 and 22 are connected in series or parallel to each other, and sequentially emit light in response to the changes of the rectified voltage Vrec which periodically rises/falls. When the rectified voltage Vrec rises, the number of LED groups which sequentially emit light is increased, and when the rectified voltage Vrec falls, the number of LED groups which sequentially emit light is decreased. The driving circuits 30 and 32 provide a current path which is changed in response to the sequential light emission of the lighting units 20 and 22 connected in series or parallel, and the driving current on the current path for sequential light emission is changed in a stepwise manner.

The sensing resistor circuit 60 is configured to control the driving currents of the driving circuits 30 and 32, and change the amount of driving current in the driving circuit 30 of the driving circuits 30 and 32 in response to change in connection state between the lighting units 20 and 22, thereby playing a role as the driving current control circuit. For this operation, the sensing resistor circuit 60 changes a sensing voltage and a resistance value of the sensing resistor applied to the driving circuit 30, in response to the change in connection state between the lighting units 20 and 22, thereby changing the amount of driving current provided to the driving circuit 30.

The sensing resistor circuit 60 may control one or more of the driving currents of the driving circuits 30 and 32, based on power consumption. For example, the sensing resistor circuit 60 may change one or more of the driving currents, such that high power consumption is formed in the range of 0.5 to 1.5 times low power consumption.

More specifically, when the lighting units 20 and 22 are connected in series, the sensing resistor circuit 60 reduces the amount of driving current in order to change the power consumption of the driving circuit 30. Thus, when the lighting units 20 and 22 are connected in series, the sensing resistor circuit 60 provides an increased resistance value and sensing voltage to the driving circuit 30, in order to reduce the amount of driving current.

That is, when the lighting units 20 and 22 are connected in series, the sensing resistor circuit 60 changes the resistance value of the sensing resistor such that the sensing voltage of the driving circuit 30 has a high level, the driving circuit 30 being connected to the lighting unit 20 which first emits light. That is, when the lighting units 20 and 22 are connected in series, the sensing resistor circuit 60 reduces the driving current of the lighting unit 20 which first emits light.

The sensing resistor circuit 60 includes a sensing resistor Rs1, a sensing resistor Rs2, a switch 52 and a sensing resistor Rs3. The sensing resistor Rs1 is connected to the sensing resistor terminal Riset1 so as to be connected to a current path of the driving circuit 30, the sensing resistor Rs2 is connected to the sensing resistor terminal Riset2 so as to be connected to a current path of the driving circuit 32, the switch 52 is connected to the sensing resistors Rs1 and Rs2 in common, and the sensing resistor Rs3 is connected in parallel to the switch 52. The sensing resistor Rs1 is used for current regulation of the driving circuit 30. The sensing resistor Rs2 is connected between the sensing resistor terminal Riset2 and the ground terminal GND2 of the driving circuit 32, used for current regulation of the driving circuit 32, and provides a fixed resistance value and a sensing voltage corresponding to the fixed resistance value.

The switch 52 of the sensing resistor circuit 60 is turned on when the lighting units 20 and 22 are connected in parallel to each other. Thus, when the switch 52 is turned on, the sensing resistor circuit 60 controls a driving current to flow into the driving circuit 30, the driving current corresponding to an amount determined by the resistance value and the sensing voltage of the sensing resistor Rs1.

On the other hand, the switch 52 of the sensing resistor circuit 60 is turned off when the lighting units 20 and 22 are connected in series to each other. Thus, when the switch 52 is turned off, the sensing resistor circuit 60 controls a driving current to flow into the driving circuit 30, the driving current corresponding to an amount determined by the resistance values and the sensing voltages of the sensing resistors Rs1 and Rs3 connected in series.

That is, the amount of driving current in the driving circuit 30 is changed in response to the switching state of the switch 52.

However, since the amount of driving current in the driving circuit 32 is irrelevant to the switching state of the switch 52 and fixed to the resistance value and the sensing voltage of the sensing resistor Rs2 connected to the ground terminal GND2, the amount of driving current in the driving circuit 32 is not changed.

The switching states of the switch included in the connection circuit 50 and the switch 52 of the sensing resistor circuit 60 may be manually changed. That is, a user may manually change the switching states in consideration of electric power environment.

The switch included in the connection circuit 50 may be configured to connect the lighting units 20 and 22 in parallel to each other in the electric power environment which provides an AC voltage of 110V, and connect the lighting units 20 and 22 in series to each other in the electric power environment which provides an AC voltage of 220V.

Figure 2:
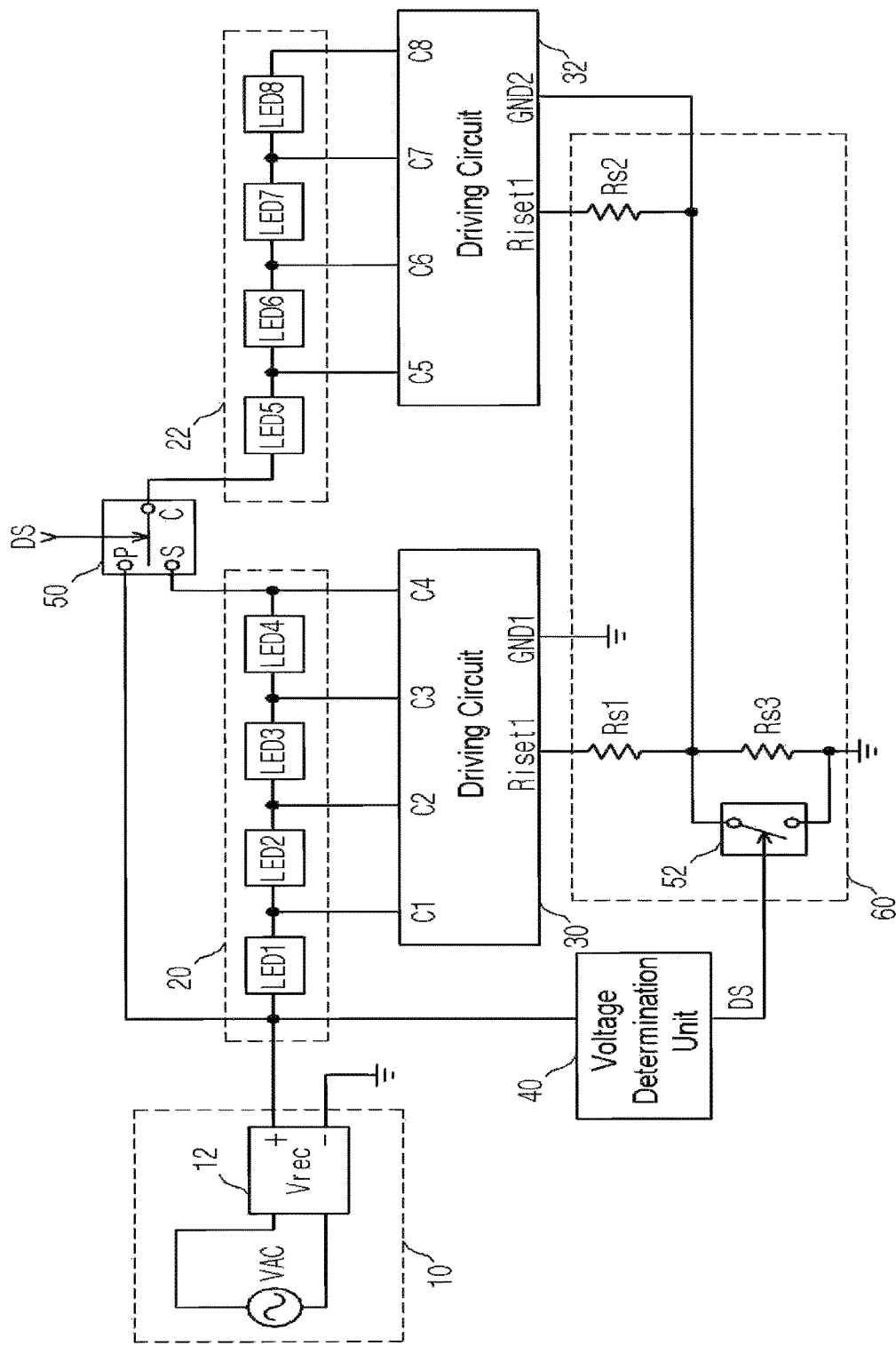
FIG. 2 is a block diagram illustrating a lighting apparatus including a voltage determination unit according to a modification of the embodiment of FIG. 1.

Unlike the embodiment of FIG. 1, the present invention may be embodied to further include a voltage determination unit 40 as illustrated in FIG. 2. The voltage determination unit 40 generates a representative value indicating the state of the rectified voltage Vrec and provides a determination signal corresponding to the representative value.

When the voltage determination unit 40 is added as illustrated in FIG. 2, the connection circuit 50 may change the connection state between the lighting units 20 and 22 in response to a change of the determination signal, and the sensing resistor circuit 60 may control the amount of driving current of the driving circuit 30 in response to the change of the determination signal.

The voltage determination unit 40 may generate a representative value corresponding to any one of the state of the rectified voltage Vrec during a half cycle or more, the peak value of the rectified voltage Vrec, the average value of rectified voltages Vrec and the average value of input currents.

The voltage determination unit 40 may divide the rectified voltage into first and second rectified voltages based on a preset reference level, and the reference level may be set in the range of 1.1 to 2.6 times the rectified voltage having a lower level between the first and second rectified voltages.

Figure 3:
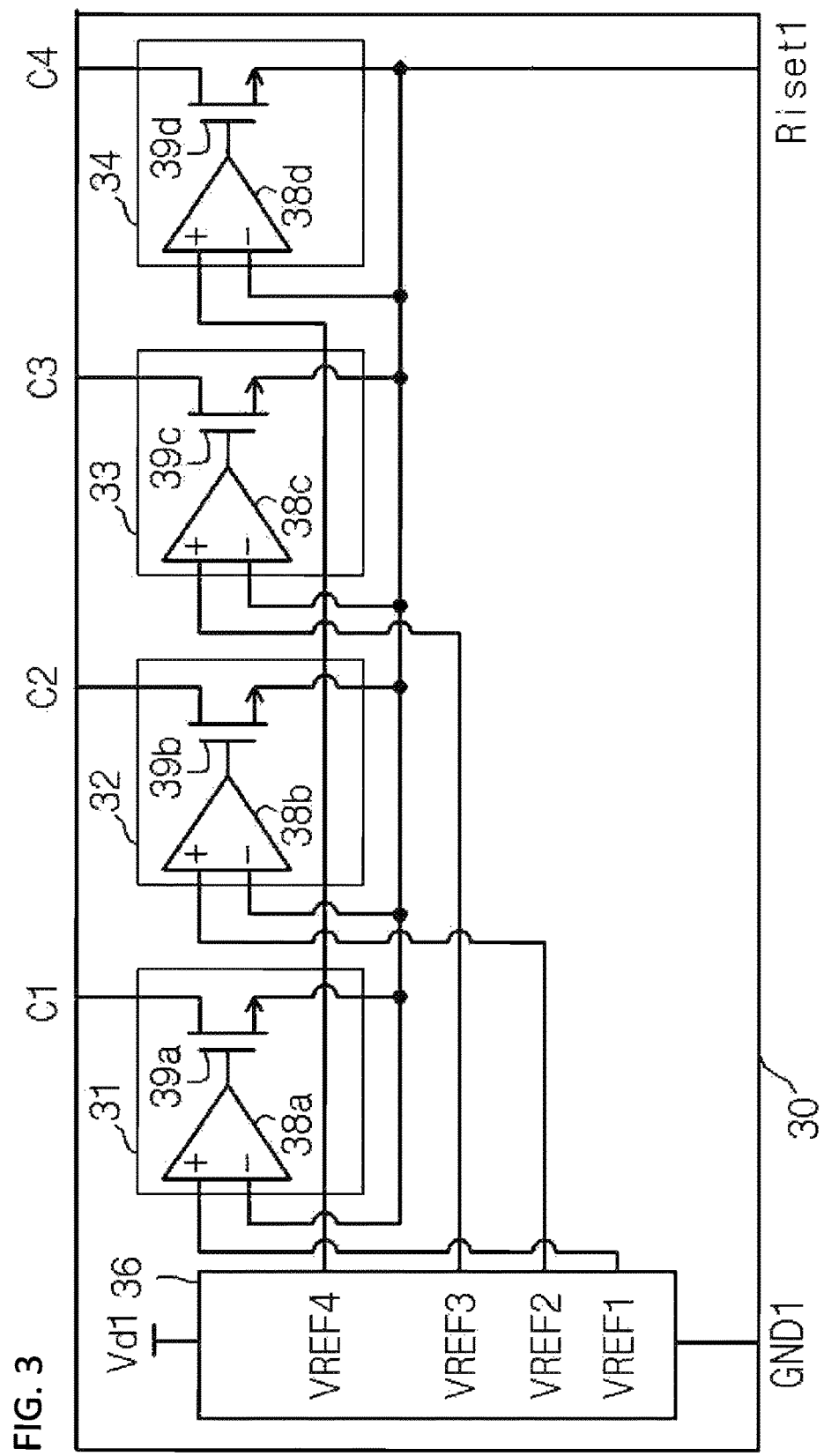
FIG. 3 is a circuit diagram illustrating a driving circuit of FIG. 2.

The driving circuit 30 of FIGS. 1 and 2 will be described with reference to FIG. 3.

The driving circuit 30 may include a plurality of switching circuits 31 to 34 and a reference voltage supply unit 36. The plurality of switching circuits 31 to 34 may be configured to provide a current path for the LED channels LED1 to LED4, and the reference voltage supply unit 36 may be configured to provide reference voltages VREF1 to VREF4.

The reference voltage supply unit 36 may be configured to provide the reference voltages VREF1 to VREF4 having different levels according to a designer's intention.

The reference voltage supply unit 36 includes a plurality of resistors connected in series, and the plurality of resistors connected in series receive a constant voltage Vd1 and are connected to the ground terminal GND1. The reference voltage supply unit 36 may be configured to output the reference voltages VREF1 to VREF4 having different levels to nodes between the respective resistors. In another embodiment, the reference voltage supply unit 36 may include independent voltage supply sources for providing the reference voltages VREF1 to VREF4 having different levels.

Among the reference voltages VREF1 to VREF4 having different levels, the reference voltage VREF1 may have the lowest voltage level, and the reference voltage VREF4 may have the highest voltage level. The reference voltages VREF1 to VREF4 may be provided in such a manner that the voltage level gradually increases in order of VREF1 to VREF4.

The reference voltage VREF1 has a level for turning off the switching circuit 31 at the point of time that the LED group LED2 emits light. More specifically, the reference voltage VREF1 may be set to a lower level than the sensing voltage which is formed in the sensing resistor Rs1 at the point of time that the LED group LED2 emits light.

The reference voltage VREF2 may have a level for turning off the switching circuit 32 at the point of time that the LED group LED3 emits light. More specifically, the reference voltage VREF2 may be set to a lower level than the sensing voltage which is formed in the sensing resistor Rs1 at the point of time that the LED group LED3 emits light.

The reference voltage VREF3 has a level for turning off the switching circuit 33 at the point of time that the LED group LED4 emits light. More specifically, the reference voltage VREF3 may be set to a lower level than the sensing voltage which is formed in the sensing resistor Rs1 at the point of time that the LED group LED4 emits light.

The reference voltage VREF4 may be set in such a manner that the current flowing through the sensing resistor Rs1 becomes a constant current in the upper limit level region of the rectified voltage Vrec.

At this time, suppose that the reference voltages Vref1 to Vref4 are set in response to when the switch 52 is turned on.

The switching circuits 31 to 34 are commonly connected to the sensing resistor Rs1 in order to perform current regulation and form a current path.

The switching circuits 31 to 34 compare the sensing voltage of the sensing resistor Rs1 to the reference voltages VREF1 to VREF4 of the reference voltage supply unit 36, respectively, and form a current path for light emission of the lighting unit 20.

Each of the switching circuits 31 to 34 may receive a high-level reference voltage, as the switching circuit is connected to an LED group remote from the position to which the rectified voltage Vrec is applied.

The switching circuits 31 to 34 may include comparators 38a to 38d and switching elements, respectively, and the switching elements may include NMOS transistors 39a to 39d, respectively.

Each of the comparators 38a to 38d of the switching circuits 31 to 34 has a positive input terminal (+) configured to receive a reference voltage, a negative input terminal (−) configured to receive a sensing voltage, and an output terminal configured to output a result obtained by comparing the reference voltage and the sensing voltage.

The NMOS transistors 39a to 39d of the respective switching circuits 31 to 34 perform a switching operation according to the outputs of the comparators 38a to 38d, which are applied through the gates thereof. The drains of the respective NMOS transistors 39a to 39d and the negative input terminals (−) of the respective comparators 38a to 38d may be commonly connected to the sensing resistor Rs1.

According to the above-described configuration, the sensing resistor Rs1 may apply the sensing voltage to the negative input terminals (−) of the comparators 38a to 38d, and provide current paths corresponding to the NMOS transistors 39a to 39d of the respective switching circuits 31 to 34.

In the lighting apparatus according to the embodiment of the present invention, the LED groups LED1 to LED4 may sequentially emit light in response to the changes of the rectified voltage Vrec, and the current paths corresponding to the sequential light emissions of the LED groups LED1 to LED4 may be provided through the driving circuit 30.

Figure 4:
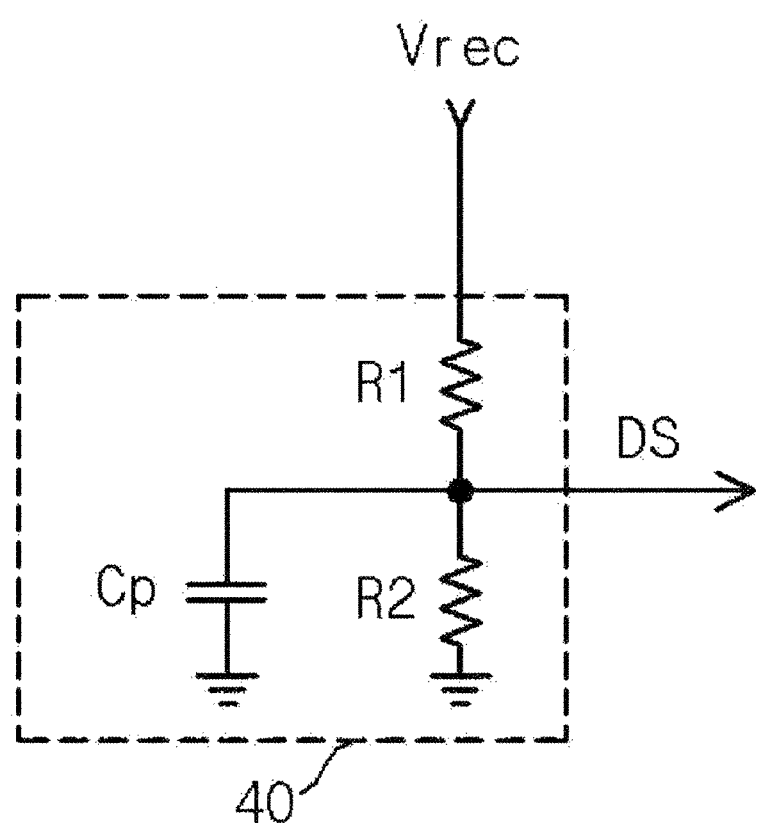
FIG. 4 is a circuit diagram illustrating a voltage determination unit of FIG. 2.

The voltage determination unit 40 will be described with reference to FIG. 4.

The voltage determination unit 40 may include resistors R1 and R2 for dividing the rectified voltage Vrec and a capacitor Cp connected in parallel to the resistor R2.

The voltage determination unit 40 configured in the above-described manner generates a representative value indicating the state of the rectified voltage Vrec, and provides a determination signal which corresponds to the representative value and can be determined to be a high level or low level based on a reference level.

The voltage determination unit 40 may generate a representative value corresponding to any one of the state of the rectified voltage Vrec during a half cycle or more, the peak value of the rectified voltage Vrec, the average value of rectified voltages Vrec and the average value of input currents, using the capacitor Cp.

For example, the average value of rectified voltages Vrec corresponding to an AC voltage of 110V and the average value of rectified voltages Vrec corresponding to an AC voltage of 220V may be different from each other, and the representative value stored in the capacitor Cp may be converted into a determination signal DS which can be determined to be a high level or low level according to the reference level, and then provided to the connection circuit 50 and the switch 52.

When a rectified voltage Vrec corresponding to the AC voltage of 110V is referred to as a first rectified voltage and a rectified voltage Vrec corresponding to the AC voltage of 220V is referred to as a second rectified voltage, the voltage determination unit 40 provides the determination signal DS to have a level for dividing the rectified voltage into the first and second rectified voltages, according to whether the determination signal DS is equal to or more than the preset reference level. The reference level may be set in the range of 1.1 to 2.6 times the lower level between the first and second rectified voltages. The reference level may be defined as various levels according to the capacity of the capacitor Cp or the resistance ratio of the resistors R1 and R2.

The parallel operation of the lighting apparatus according to the present embodiment will be described with reference to FIGS. 5 and 6, and the serial operation of the lighting apparatus according to the present embodiment will be described with reference to FIGS. 7 and 8.

Figure 5:
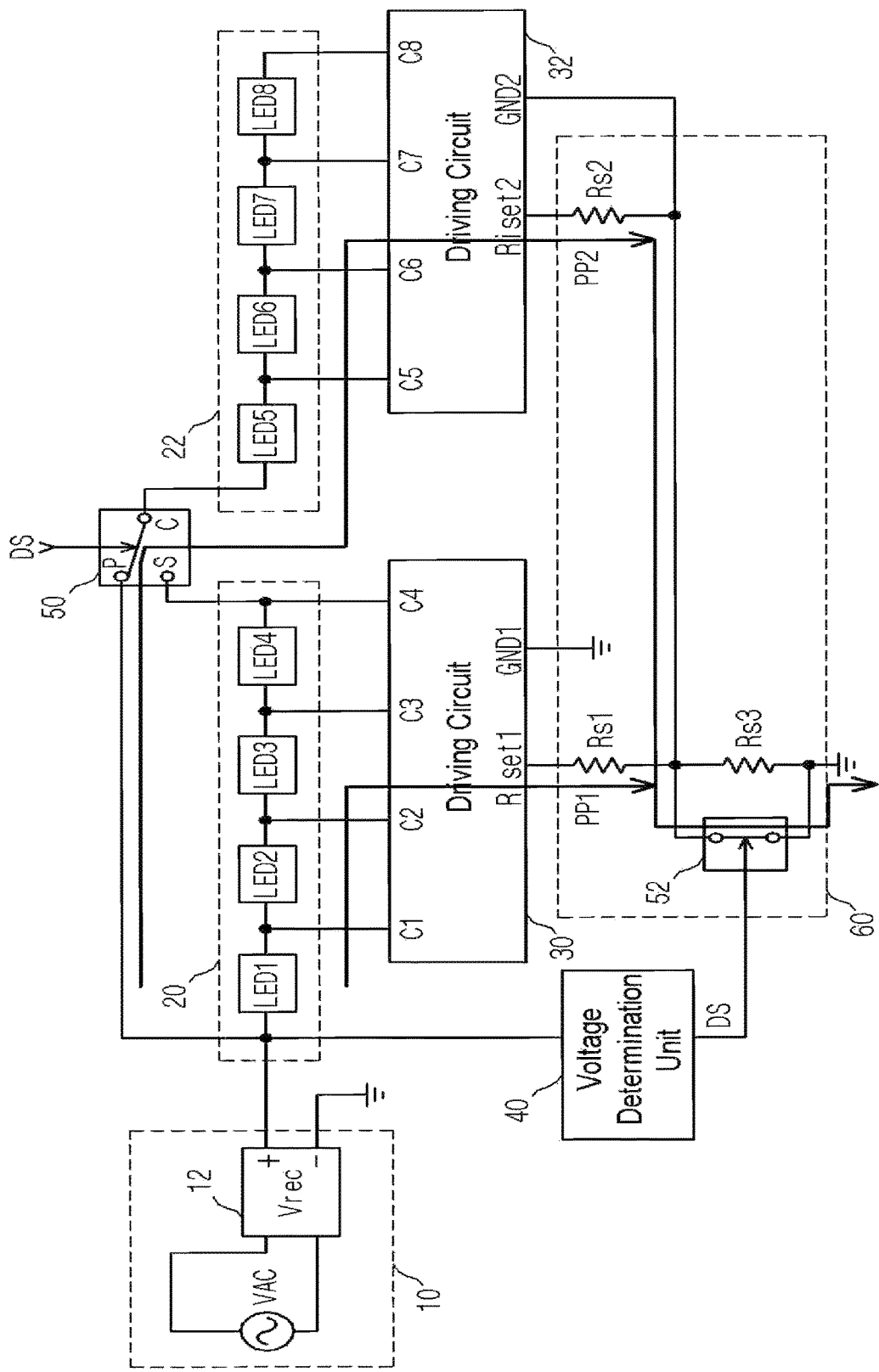
FIG. 5 is a block diagram illustrating that lighting units of FIG. 2 are connected in parallel.
Figure 6:
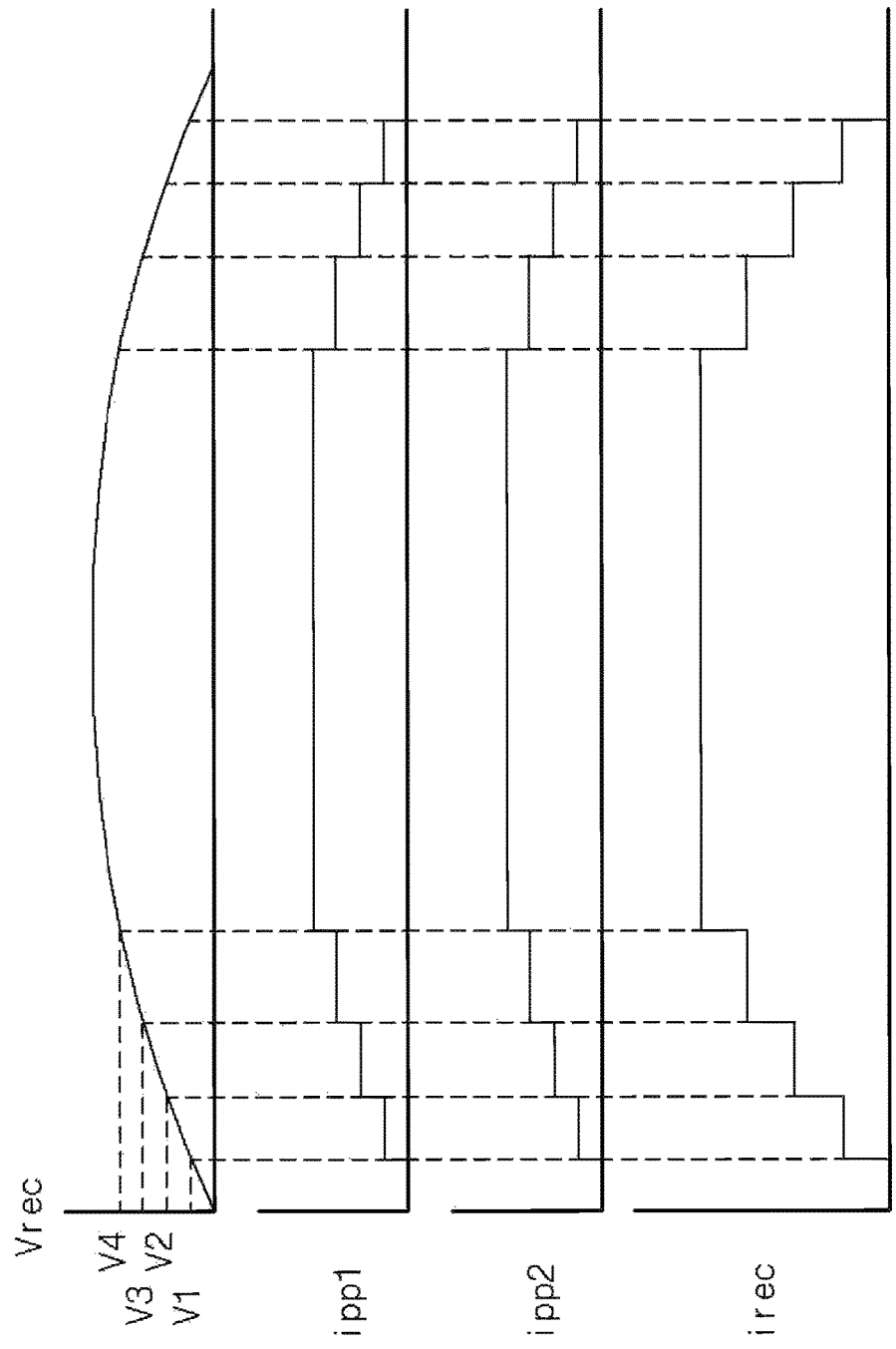
FIG. 6 is a waveform diagram illustrating a rectified voltage and a driving current corresponding to the state of FIG. 5.

The parallel operation state of FIGS. 5 and 6 corresponds to the case in which the determination signal DS is outputted at a low level because the representative value corresponding to the rectified voltage Vrec is lower than the reference level. At this time, the rectified voltage Vrec may correspond to an AC voltage of 110V, for example.

When the determination signal DS is provided at a low level, the connection circuit 50 provides a path between the parallel terminal P and the common terminal C to connect the lighting units 20 and 22 in parallel.

When the determination signal DS is provided at a low level, the switch 52 of the sensing resistor circuit 60 maintains a turn-on state. As a result, the driving circuit 30 regulates a driving current using the resistance value and the sensing voltage of the sensing resistor Rs1, and the driving circuit 32 regulates a driving current using the resistance value and the sensing voltage of the sensing resistor Rs2. The sensing resistors Rs1 and Rs2 may be designed to have the same resistance value. In this case, the driving circuits 30 and 32 may use the same resistance value and sensing voltage in response to the rectified voltage Vrec, and driving currents ipp1 and ipp2 corresponding to light emissions of the lighting units 20 and 22 may have the same waveform and level.

When the lighting units 20 and 22 are connected in parallel as illustrated in FIGS. 5 and 6, the operations of the lighting unit 20 and the driving circuit 30 in response to changes of the rectified voltage Vrec are performed as follows.

When the rectified voltage Vrec is in the initial state, all of the switching circuits 31 to 34 maintain a turn-on state because the reference voltages VREF1 to VREF4 applied to the positive input terminals (+) thereof are higher than the sensing voltage of the resistor Rs1, which is applied to the negative input terminals (−) thereof. However, since the rectified voltage Vrec has a level which is not enough to turn on the LED groups LED1 to LED4, the LED groups LED1 to LED4 do not emit light.

Then, when the rectified voltage Vrec rises to reach the light emission voltage V1, the LED group LED1 emits light. When the LED group LED1 of the lighting unit 20 emits light, the switching circuit 31 connected to the LED group LED1 provides a current path for light emission.

When the rectified voltage Vrec reaches the light emission voltage V1 such that the LED group LED1 emits light and the current path is formed through the switching circuit 31, the current ipp1 increased to a predetermined level is supplied to the LED group LED1.

In response to the light emission of the LED group LED1, the current ipp1 flows along a path passing through the LED group LED1, the switching circuit 31 of the driving circuit 30 and the sensing resistor Rs1.

Then, when the rectified voltage Vrec continuously rises to reach the light emission voltage V2, the LED group LED2 emits light. When the LED group LED2 of the lighting unit 20 emits light, the switching circuit 32 connected to the LED group LED2 provides a current path for light emission.

When the rectified voltage Vrec reaches the light emission voltage V2 such that the LED group LED2 emits light and the current path is formed through the switching circuit 32, the level of the sensing voltage of the sensing resistor Rs1 rises. At this time, the sensing voltage has a higher level than the reference voltage VREF1. Therefore, the NMOS transistor 39a of the switching circuit 31 is turned off by an output of the comparator 38a. That is, the switching circuit is turned off, and the switching circuit 32 provides a current path corresponding to the light emission of the LED group LED2. At this time, the LED group LED1 also maintains the light emitting state, and the level of the driving current ipp1 rises to the level regulated by the switching circuit 32.

Then, when the rectified voltage Vrec continuously rises to reach the light emission voltage V3, the LED group LED3 emits light. When the LED group LED3 emits light, the switching circuit 33 connected to the LED group LED3 provides a current path for light emission.

When the rectified voltage Vrec reaches the light emission voltage V3 such that the LED group LED3 emits light and the current path is formed through the switching circuit 33, the level of the sensing voltage of the sensing resistor Rs1 rises. At this time, the sensing voltage has a higher level than the reference voltage VREF2. Therefore, the NMOS transistor 39b of the switching circuit 32 is turned off by an output of the comparator 38b. That is, the switching circuit is turned off, and the switching circuit 33 provides the current path corresponding to the light emission of the LED group LED3. At this time, the LED groups LED1 and LED2 also maintain the light emitting state, and the level of the driving current ipp1 rises to the level regulated by the switching circuit 33.

Then, when the rectified voltage Vrec continuously rises to reach the light emission voltage V4, the LED group LED4 emits light. When the LED group LED4 emits light, the switching circuit 34 connected to the LED group LED4 provides a current path for light emission.

When the rectified voltage Vrec reaches the light emission voltage V4 such that the LED group LED4 emits light and the current path is formed through the switching circuit 34, the level of the sensing voltage of the sensing resistor Rs1 rises. At this time, the sensing voltage has a higher level than the reference voltage VREF3. Therefore, the NMOS transistor 39c of the switching circuit 33 is turned off by an output of the comparator 38c. That is, the switching circuit is turned off, and the switching circuit 34 provides the current path corresponding to the light emission of the LED group LED4. At this time, the LED groups LED1 to LED3 also maintain the light emitting state, and the level of the driving current ipp1 rises to the level regulated by the switching circuit 34.

The light emission of the LED group LED4 is maintained until the rectified voltage Vrec falls to reach the light emission voltage V4 after rising to the maximum level.

Then, when the rectified voltage Vrec continuously falls, the switching circuits 34 to 31 connected to the LED groups LED4 to LED1 are sequentially turned off, the LED groups LED4 to LED1 are sequentially turned off, and the driving current ipp1 decreases in a stepwise manner.

The operations of the lighting unit 22 and the driving circuit 32 in response to the changes of the rectified voltage Vrec are simultaneously performed in the same manner as the operations of the lighting unit 20 and the driving circuit 30. Thus, the detailed descriptions thereof are omitted herein.

The entire driving current irec is equal to the sum of the driving currents ipp1 and ipp2 of the lighting units 20 and 22 connected in parallel, and a current path PP1 by the driving circuit 30 and a current path PP2 by the driving circuit 32 are formed at the same time.

Figure 7:
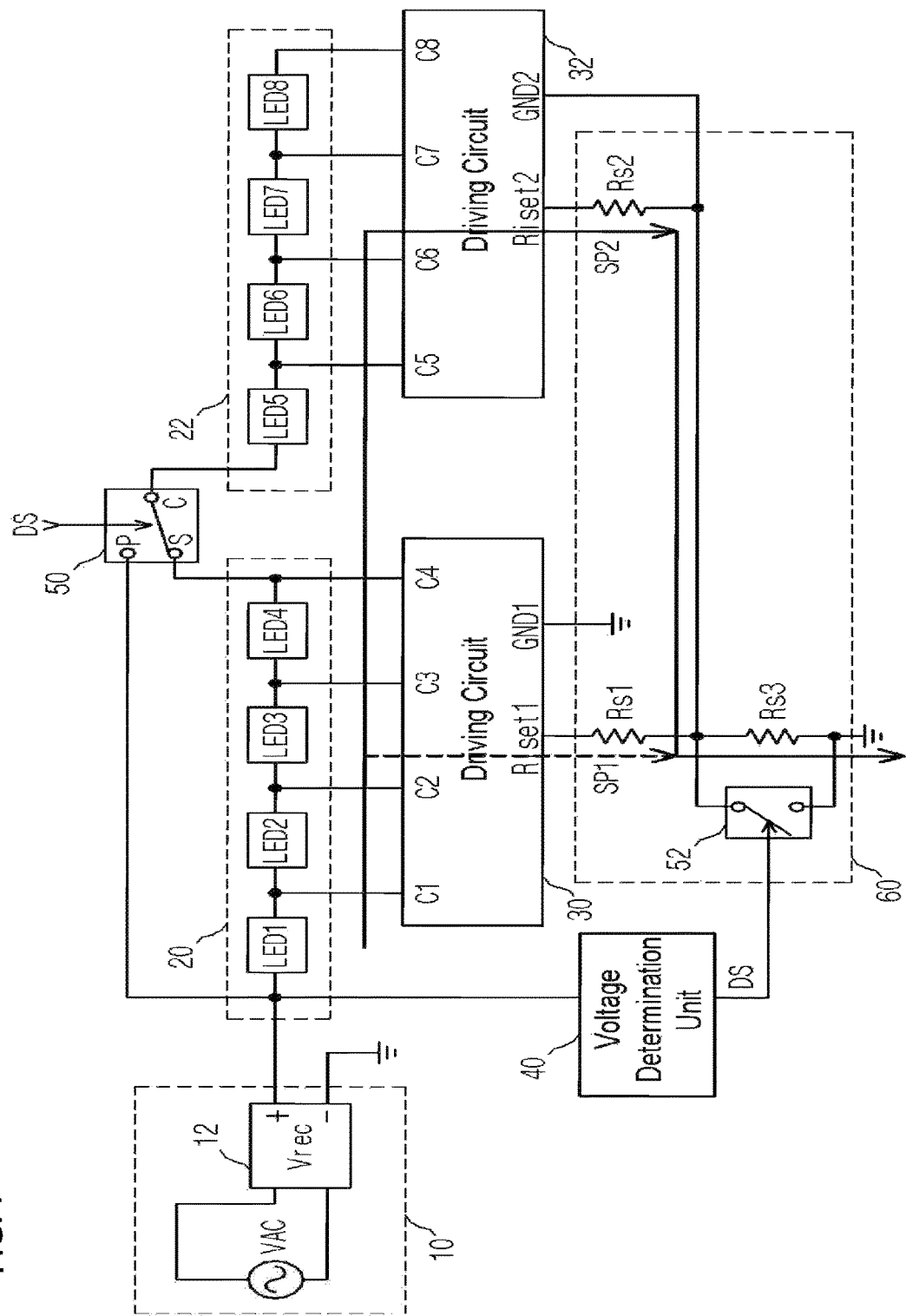
FIG. 7 is a block diagram illustrating that the lighting units of FIG. 2 are connected in series.
Figure 8:
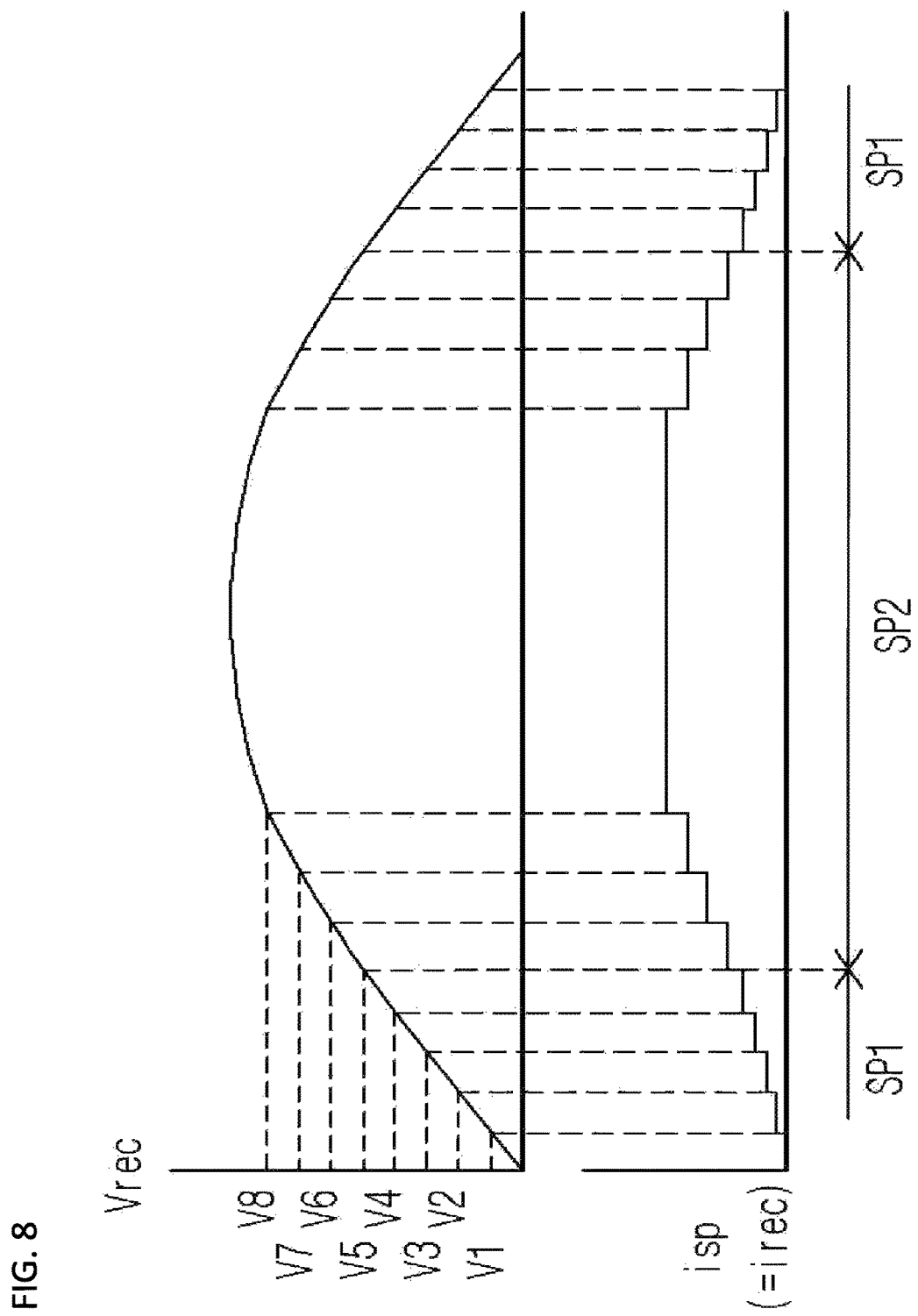
FIG. 8 is a waveform diagram illustrating a rectified voltage and a driving current corresponding to the state of FIG. 7.

The serial operation state of FIGS. 7 and 8 corresponds to the case in which the determination signal DS is outputted at a high level because the representative value corresponding to the rectified voltage Vrec is equal to or higher than the reference level. At this time, the rectified voltage Vrec may correspond to an AC voltage of 220V, for example.

When the determination signal DS is provided at a high level, the connection circuit 50 provides a path between the serial terminal S and the common terminal C to connect the lighting units 20 and 22 in series.

When the determination signal DS is provided at a high level, the switch 52 of the sensing resistor circuit 60 maintains a turn-off state. As a result, the driving circuit 30 provides a current path and performs regulation, using the resistance value and the sensing voltage of the sensing resistors Rs1 and Rs3, and the driving circuit 32 provides a current path and performs regulation, using the resistance value and the sensing voltage of the sensing resistor Rs2. At this time, the resistance value and the sensing voltage of the sensing resistors Rs1 and Rs3 are higher than the resistance value and the sensing voltage of the sensing resistor Rs2.

Thus, when the lighting units 20 and 22 are connected in series as illustrated in FIGS. 7 and 8, the driving current of the driving circuit 30 becomes smaller than when the switch 52 is turned on as illustrated in FIGS. 5 and 6. As a result, the sensing resistor circuit 60 reduces the driving current of the driving circuit 30.

For example, when the lighting unit 20 is connected in parallel in response to the rectified voltage Vrec corresponding to an AV voltage of 110V, the current consumptions of the respective channels of the driving circuit are as follows: LED group LED1:LED group LED2:LED group LED3: LED group LED4=20 mA:40 mA:50 mA:60 mA. At this time, since the sensing resistance value of the driving circuit 32 is equal to that of the driving circuit 30, the current consumptions of the respective channels of the driving circuit 32 are also equal to the current consumptions of the respective channels of the driving circuit 30.

However, when the lighting units 20 and 22 are connected in series, the resistance value and the sensing voltage by the sensing resistors Rs1 and Rs3 in the driving circuit 30 rise because the sensing resistor Rs3 is added. Thus, the current consumptions of the respective channels of the driving circuit 30 are as follows: LED group LED1:LED group LED2:LED group LED3:LED group LED4=5 mA:10 mA:12.5 mA:15 mA. At this time, since the driving circuit 32 uses the sensing resistance value and sensing voltage fixed by the sensing resistor Rs2, the current consumptions of the respective channels of the driving circuit 32 are maintained as follows: LED group LED5:LED group LED6: LED group LED7:LED LED group LED8=20 mA:40 mA:50 mA:60 mA.

When the lighting units 20 and 22 are connected in series and the resistance value and the sensing voltage of the sensing resistor in the driving circuit 30 rise in response to the serial connection, the LED groups LED1 to LED8 sequentially emit light.

As the sensing resistance value and the sensing voltage of the driving circuit 30 rise, the LED groups LED1 to LED4 of the lighting unit 20 sequentially emit light in response to the rectified voltage Vrec lower than when the lighting units 20 and 22 are connected in parallel, and the driving current i_sp increases in a stepwise manner in response to the sequential light emissions of the LED groups LED1 to LED4.

When the rectified voltage Vrec rises after the sequential light emission of the lighting unit 20, sequential light emission of the lighting unit 22 is performed, and the driving circuit 32 provides a current path and performs current regulation, in response to the sequential light emission of the lighting unit 22. At this time, the sensing voltage applied to the driving circuit 32 is determined by the resistance value of the sensing resistor Rs2, and lower than the sensing voltage provided to the driving circuit 30.

Since the sequential light emissions of the lighting units 20 and 22 and the operations of the driving circuits 30 and 32 in response to the sequential light emissions have been described with reference to FIGS. 5 and 6, the detailed descriptions thereof are omitted herein.

At this time, the entire driving current irec is substantially equal to a driving current inputted to the lighting units 20 and 22 connected in series. Furthermore, the current path SP1 by the driving circuit 30 is first formed, and the current path SP2 by the driving circuit 32 is then formed in response to the increase of the rectified voltage Vrec.

As described above, the sensing resistor circuit 60 operates as a driving current control circuit. More specifically, when the lighting units 20 and 22 are connected in series, the sensing resistor circuit 60 controls the driving currents of the first current path formed by the driving circuit and the second current path formed by the driving circuit 32, and reduces the amount of driving current of the driving circuit 30 corresponding to the lighting unit 20 which first emits light.

At this time, the sensing resistor circuit 60 may change the amount of driving current of the driving circuit 30 such that the higher power consumption between power consumptions caused by the driving currents of the driving circuits 30 and 32 is formed in the range of 0.5 to 1.5 times the lower power consumption.

In the present embodiment, when the lighting units and 22 are connected in series, the total number of channels which are divided by the amount of driving current in response to sequential light emission may be controlled to be larger than the number of channels included in each of the lighting units 20 and 22. That is, when the lighting unit 20 has X channels, the lighting unit 22 has Y channels, and the lighting units 20 and 22 are connected in series where X and Y are natural numbers, the total number of channels which are divided by the amount of driving current in response to sequential light emission may be equal to or more than the larger between X and Y.

Through the above-described configuration, the lighting apparatus according to the present embodiment may have the universality for the change of the electric power environment for providing an AC voltage of 110V.

More specifically, since the electrical connection state between the lighting units included in the lighting apparatus according to the present embodiment is changed to the serial or parallel state according to the state of the rectified voltage, the lighting apparatus may have the universality corresponding to the change of the electric power environment.

In order to control the driving currents of the driving circuits 30 and 32, the driving current control circuit may be configured to change the reference voltage. The configuration may be exemplified as illustrated in FIGS. 9 and 10.

Figure 9:
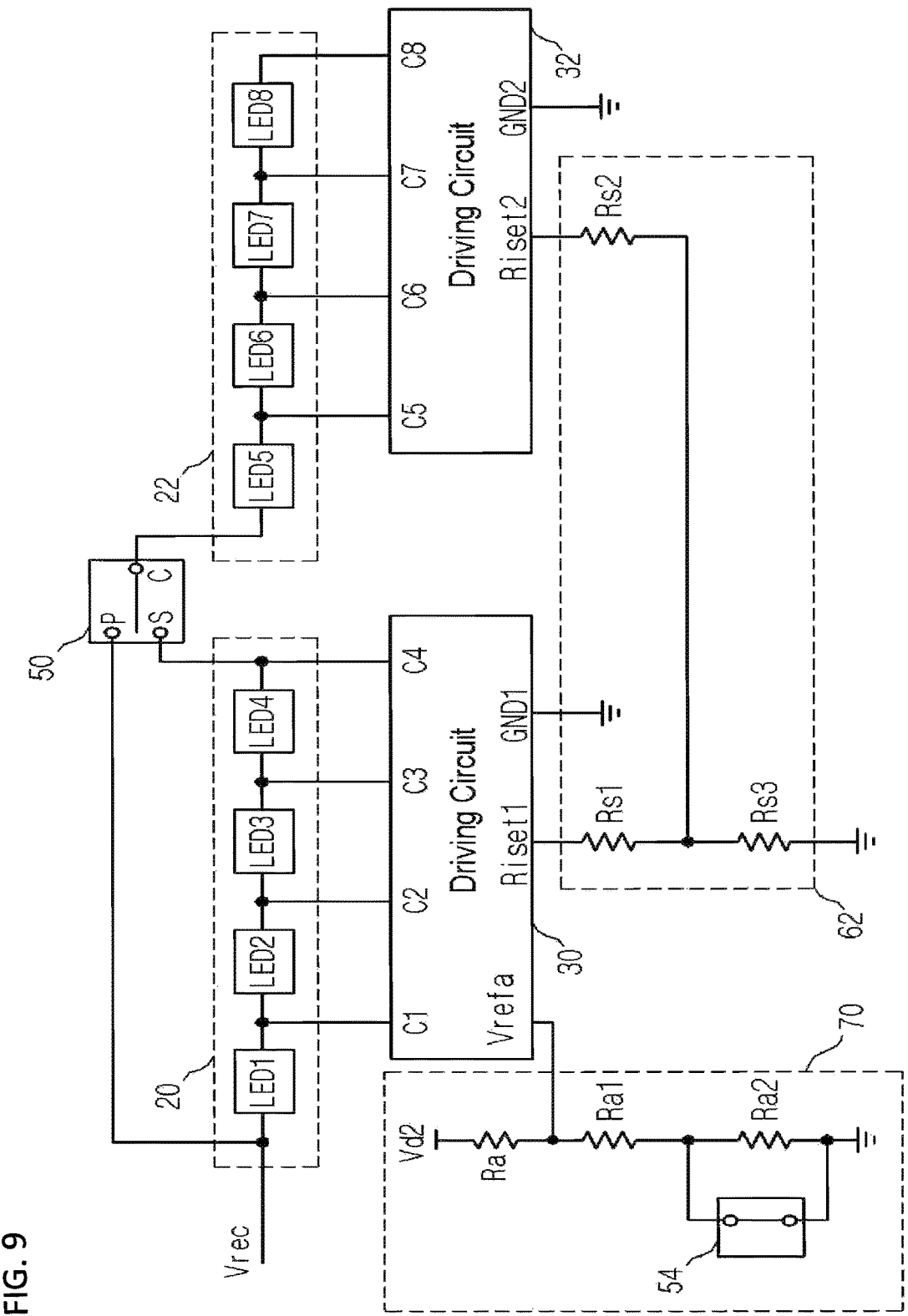
FIG. 9 is a block diagram illustrating a lighting apparatus according to another embodiment of the present invention.

FIG. 9 illustrates that the connection state between the lighting units 20 and 22 is manually changed, and the switching state of a reference voltage control circuit 70 is manually set. FIG. 10 illustrates that the voltage determination unit 40 is included, the connection state between the lighting units 20 and 22 is changed through the determination signal DS of the voltage determination unit 40, and the switching state of the reference voltage control circuit 70 is set according to the determination signal DS of the voltage determination unit 40. In the embodiments of FIGS. and 10, a sensing resistor circuit 62 and a reference voltage control circuit 70 may be included as the driving current control circuit. In this case, the driving current control circuit may change the reference voltage of the driving circuit 30 according to the operation of the reference voltage control circuit 70, thereby reducing the driving current of the driving circuit 30.

Figure 10:
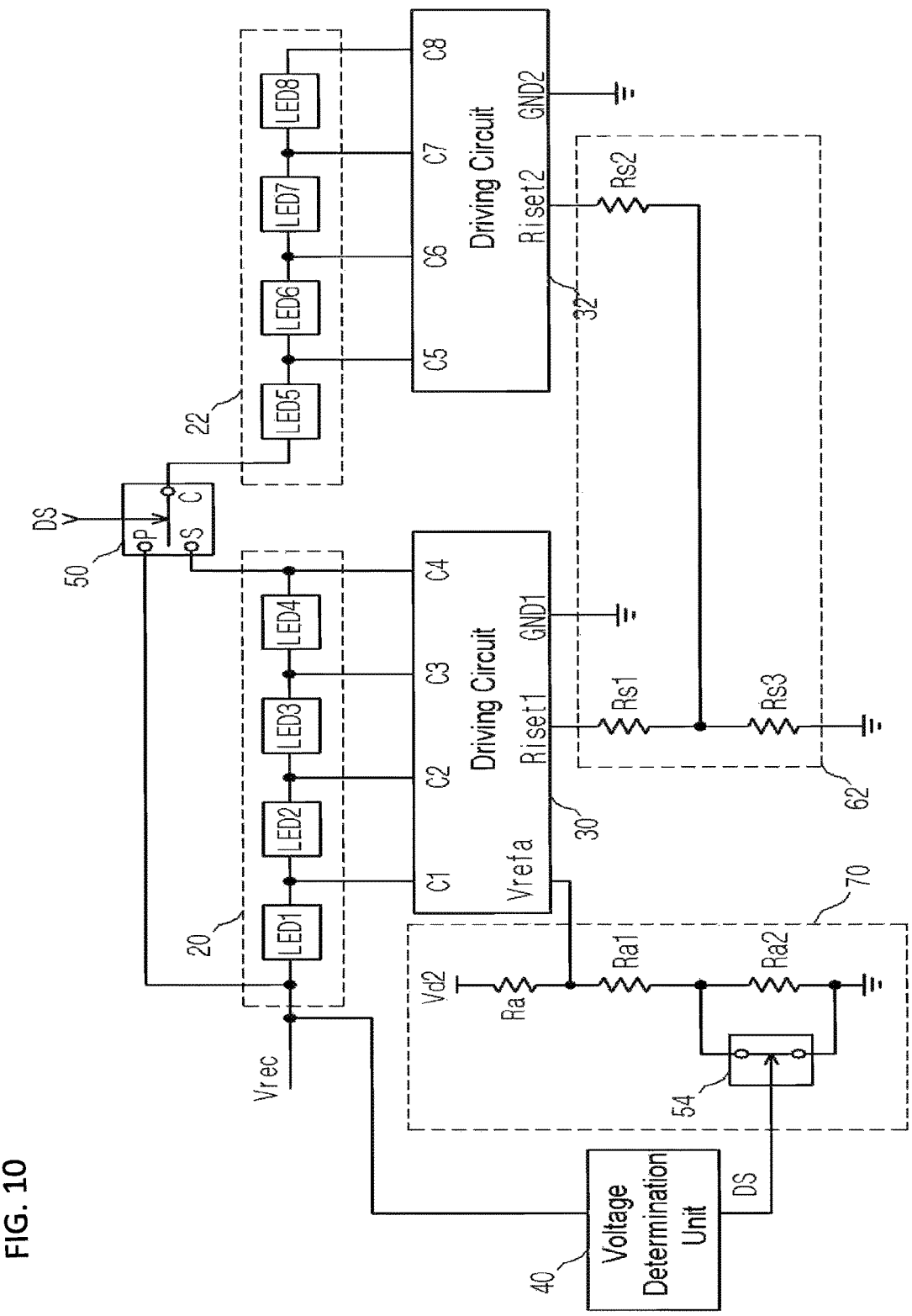
FIG. 10 is a block diagram illustrating a lighting apparatus including a voltage determination unit according to a modification of the embodiment of FIG. 9.

Since the embodiments of FIGS. 9 and 10 have the same configuration except the voltage determination unit 40, the following descriptions will be focused on the embodiment of FIG. 10.

Referring to FIG. 10, the sensing resistor circuit 62 included in the driving current control circuit provides a fixed sensing resistance value and a fixed sensing voltage to the driving circuits 30 and 32, and the reference voltage control circuit 70 included in the driving current control circuit controls the reference voltage to control the amount of driving current of the driving circuit 30. In FIG. 10, the other components except the above-described configuration are configured in the same manner as FIG. 2. Thus, the duplicated descriptions thereof are omitted herein.

The reference voltage control circuit 70 includes resistors Ra, Ra1 and Ra2 connected in series to receive a constant voltage Vd2, a node between the resistors Ra and Ra1 is connected to a reference voltage terminal Vrefa of the driving circuit, and a switch 54 is connected in parallel to the resistor Ra2. The switch 54 is switched in response to the determination signal of the voltage determination unit 40.

According to the determination signal DS, the switch 54 is turned off when the lighting units 20 and 22 are connected in parallel, and turned on when the lighting units 20 and 22 are connected in series.

When the lighting units 20 and 22 are connected in parallel, the reference voltage of the driving circuit 30 may be determined by a voltage applied to the reference voltage terminal Vrefa. At this time, the driving circuits 30 and 32 may generate the same reference voltage. In this case, a voltage applied to the node between the resistors Ra and Ra1 among the resistors Ra, Ra1 and Ra2 connected in series is applied to the reference voltage terminal Vrefa of the driving circuit 30 by the turn-off of the switch 54. The voltage applied to the reference voltage terminal Vrefa is determined according to the resistance ratio of the resistor Ra to the resistors Ra1 and Ra2.

However, when the lighting units 20 and 22 are connected in series, the switch 54 is turned on by the determination signal DS. As a result, the voltage applied to the reference voltage terminal Vrefa of the driving circuit 30 is determined according to the resistance ratio of the resistor Ra to the resistor Ra1. That is, the voltage applied to the reference voltage terminal Vrefa is lowered. As a result, the reference voltage of the driving circuit 30 is decreased, and the driving current of the driving circuit 30 is reduced.

More specifically, when the lighting units 20 and 22 are connected in parallel, the driving circuits 30 and 32 may provide reference voltages of 0.4V, 0.8V, 1.0V and 1.2V to the respective channels.

However, when the lighting units 20 and 22 are connected in series, the driving circuit 30 may provide reference voltages of 0.1V, 0.2V, 0.25V and 0.3V to the respective channels, because the voltage applied to the reference voltage terminal Vrefa is lowered. As the reference voltages are changed, the current consumptions of the respective channels of the driving circuit 30 may be changed as in the above-described embodiment.

Figure 11:
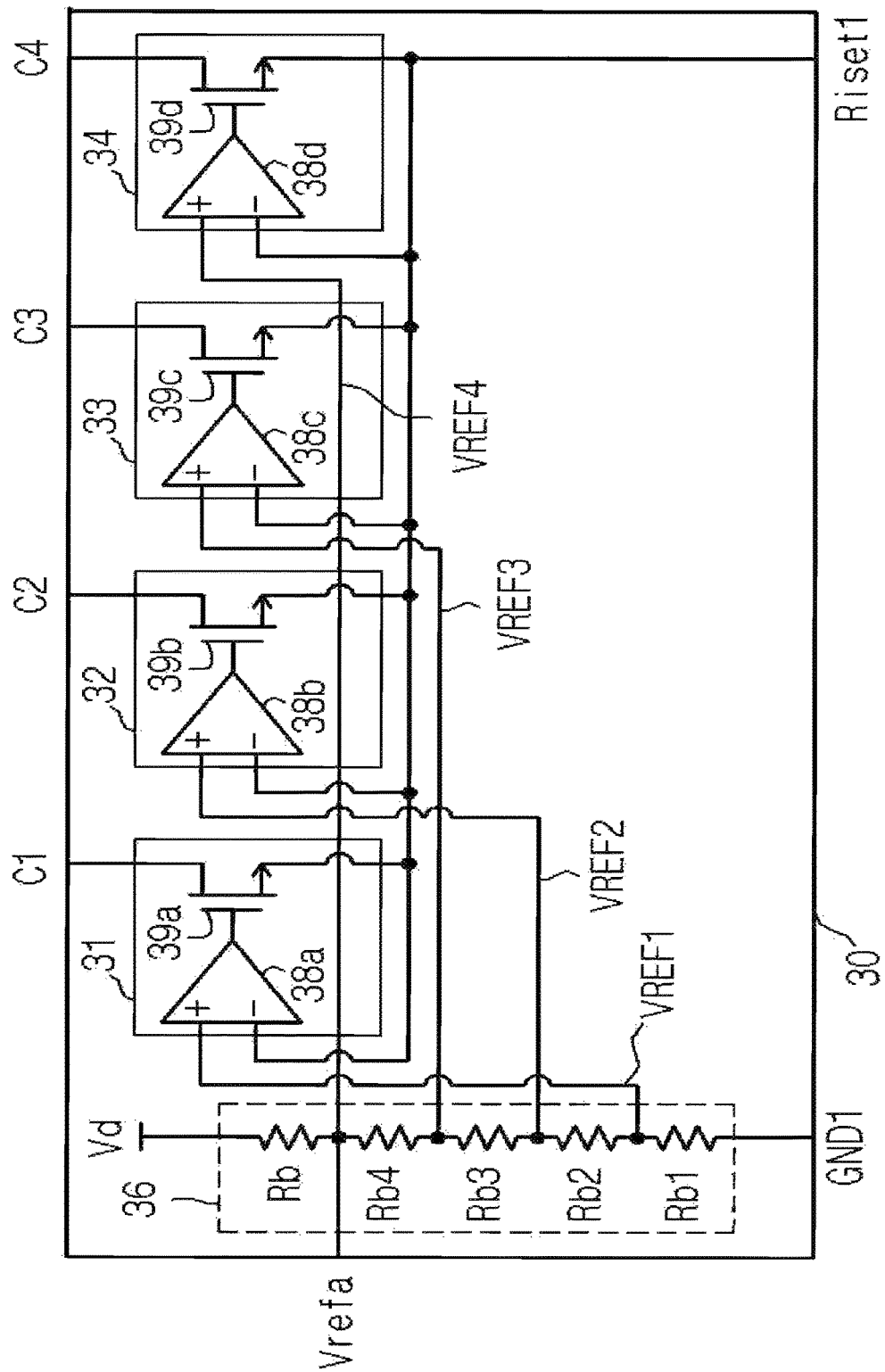
FIG. 11 is a circuit diagram illustrating a driving circuit of FIG. 10.

The change in reference voltages of the driving circuit may be understood with reference to FIG. 11.

The reference voltage supply unit 36 of the driving circuit 30 may change the entire reference voltages according to the voltage of the reference voltage terminal Vrefa, which is applied to a node between a resistor Rb and a resistor Rb4 among resistors connected in series.

That is, the reference voltage supply unit 36 reduces the entire reference voltages when the voltage applied to the reference voltage terminal Vrefa is reduced.

Therefore, when the lighting units 20 and 22 are connected in series, the driving circuit 30 is operated according to the reduced reference voltages.

Hereafter, the operation of the embodiment of FIG. 10 will be described.

When the determination signal DS is provided at a low level, the connection circuit 50 provides a path between the parallel terminal P and the common terminal C to connect the lighting units 20 and 22 in parallel.

At this time, the driving circuits 30 and 32 may generate the same reference voltage. The sensing voltages of the driving circuits 30 and 32 are fixed to the same level by the sensing resistors Rs1, Rs2 and Rs3.

Thus, the lighting units 20 and 22 are connected in parallel and sequentially emit light in response to the changes of the rectified voltage. At this time, the driving currents of the respective channels of the driving circuit 30 are equal to the driving currents of the respective channels of the driving circuit 32.

However, when the determination signal DS is provided at a high level, the connection circuit 50 provides a path between the serial terminal S and the common terminal C to connect the lighting units 20 and 22 in series to each other. At this time, the reference voltages of the driving circuit 30 are reduced by the operation of the reference voltage control circuit 70, and the reference voltages of the driving circuit 32 are retained at the same levels as the lighting units 20 and 22 are connected in parallel.

When the lighting units 20 and 22 are connected in series and the reference voltages of the driving circuit 30 are reduced, the LED groups LED1 to LED8 of the lighting units 20 and 22 sequentially emit light. In this case, the reference voltages and the driving current of the driving circuit 30 are reduced by the operation of the reference voltage control circuit 70 included in the driving current control circuit, compared to when the lighting units 20 and 22 are connected in parallel.

Figure 12:
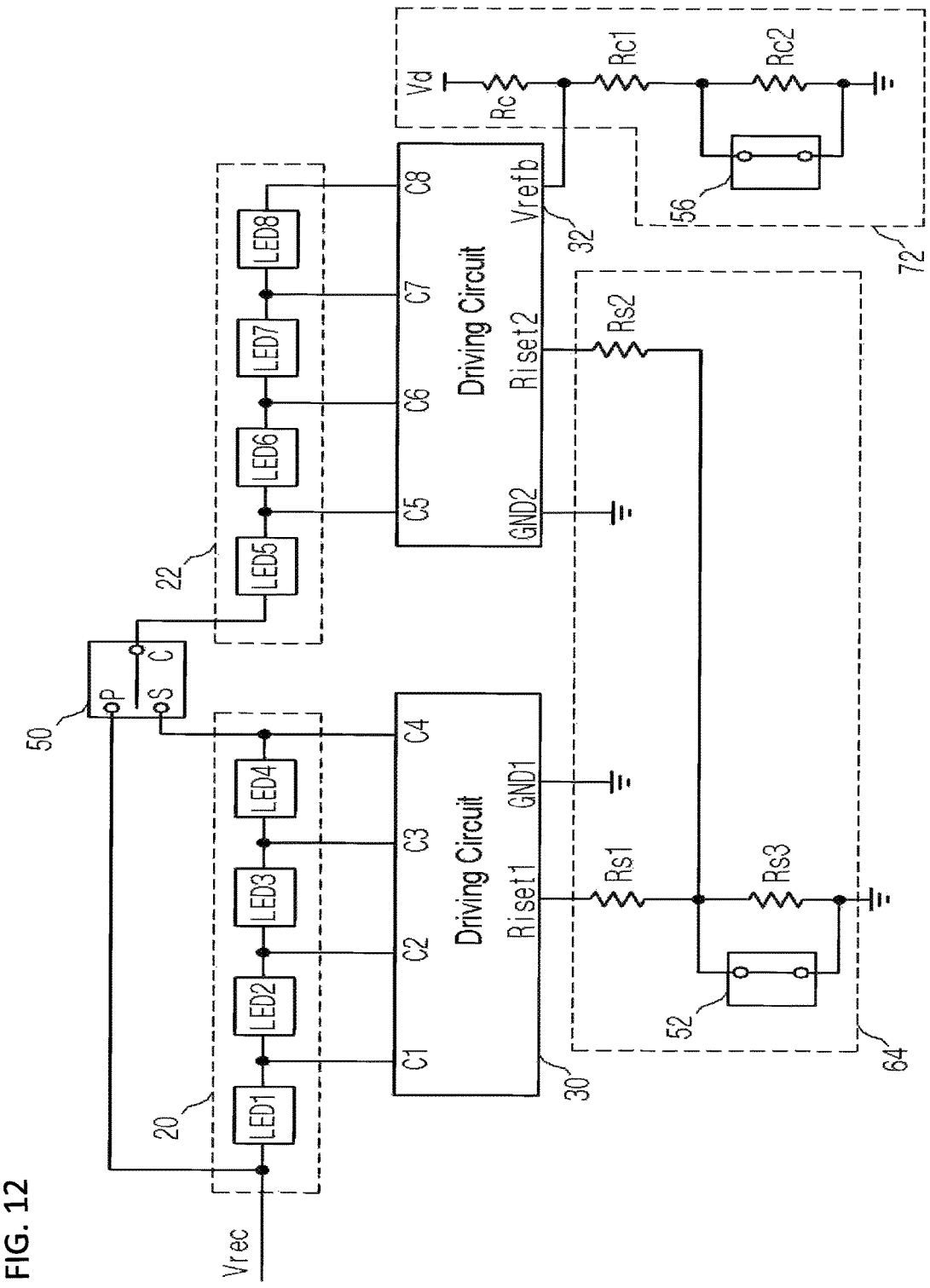
FIG. 12 is a block diagram illustrating a lighting apparatus according to another embodiment of the present invention.
Figure 13:
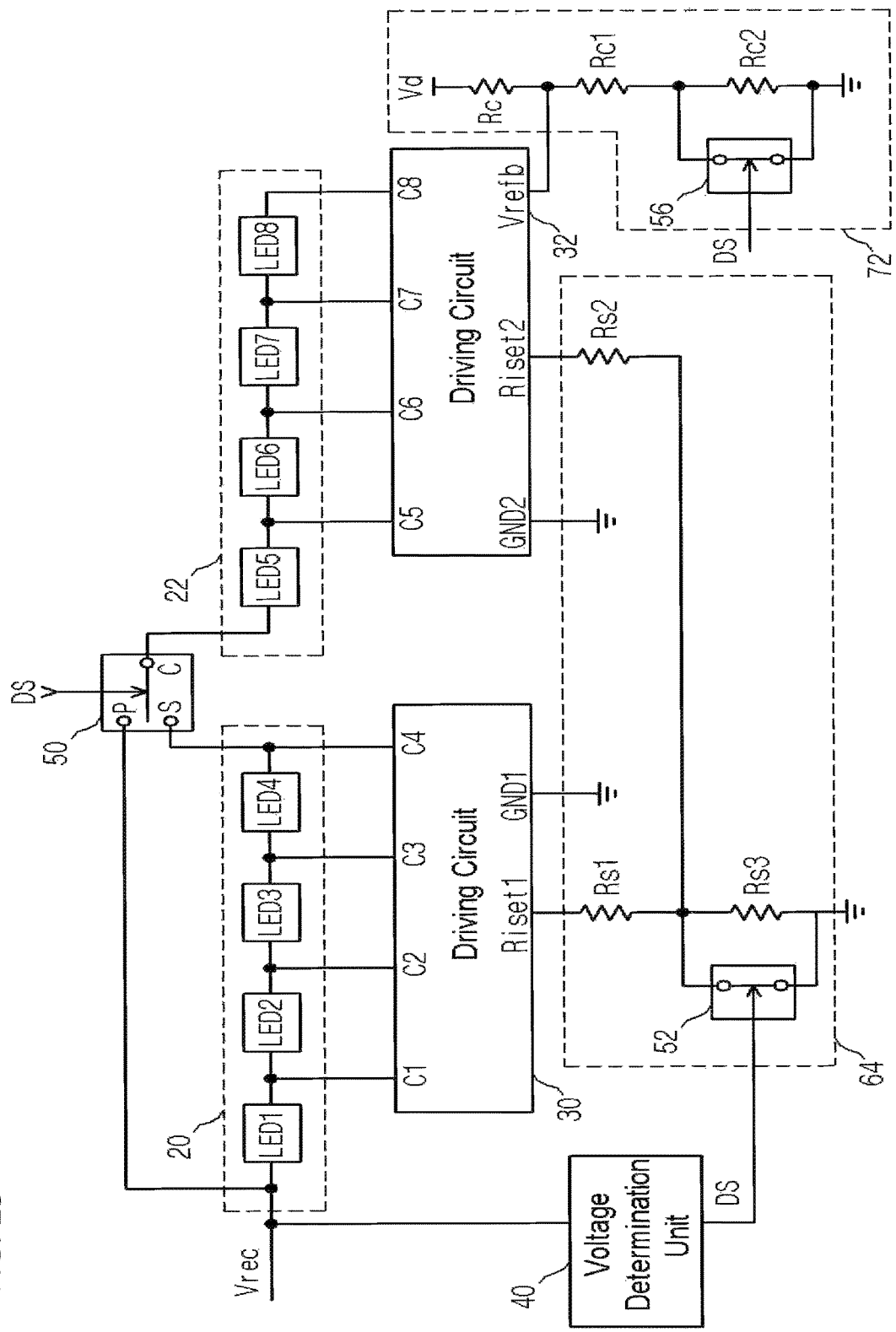
FIG. 13 is a block diagram illustrating a lighting apparatus including a voltage determination unit according to a modification of the embodiment of FIG. 12.

Furthermore, the present invention may be embodied to control all of the driving currents of the driving circuits 30 and 32. In this case, the driving current control circuit may change the resistance value and the reference voltage of the sensing resistor. Such a configuration may be exemplified as illustrated in FIGS. 12 and 13. In FIGS. 12 and 13, the driving current control circuit may include a sensing resistor circuit 64 and a reference voltage control circuit 72.

FIG. 12 illustrates that the connection state between the lighting units 20 and 22 is manually changed, and the switching states of the sensing resistor circuit 64 and the reference voltage control circuit 72 are manually set. FIG. illustrates that the voltage determination unit 40 is included, the connection state between the lighting units 20 and 22 is changed through the determination signal DS of the voltage determination unit 40, and the switching states of the sensing resistor circuit 64 and the reference voltage control circuit 72 which are included in the driving current control circuit are set according to the determination signal DS of the voltage determination unit 40.

Since the embodiments of FIGS. 12 and 13 are configured in the same manner except the voltage determination unit 40, the following descriptions will be focused on the embodiment of FIG. 13.

Referring to FIG. 13, the sensing resistor circuit 64 included in the driving current control circuit changes the sensing resistance voltages and the sensing voltages of the driving circuits 30 and 32 in response to a change in connection state between the lighting units 20 and 22, and thus controls the driving currents of the driving circuits 30 and 32. The reference voltage control circuit 72 included in the driving current control circuit controls the reference voltage of the driving circuit 32, and controls the driving current of the driving circuit 32.

In FIG. 13, the other components except the above-described configuration are configured in the same manner as FIG. 2. Thus, the duplicated descriptions thereof are omitted herein.

When the lighting units 20 and 22 are connected in series in response to the rectified voltage Vrec by the operation of the sensing resistor circuit 64, the embodiment of FIG. 13 may raise the sensing resistance values and the sensing voltages of the sensing resistors of the driving circuits 30 and 32, and reduce the driving currents of the driving circuits 30 and 32, compared to when the lighting units 20 and 22 are connected in parallel in response to the rectified voltage Vrec.

Furthermore, when the lighting units 20 and 22 are connected in series in response to the rectified voltage Vrec by the reference voltage control circuit 72, the embodiment of FIG. 13 may raise the reference voltage provided to the driving circuit 32 and increase the driving current of the driving circuit 32, compared to when the lighting units 20 and 22 are connected in parallel in response to the rectified voltage Vrec.

The reference voltage control circuit 72 includes resistors Rc, Rd1 and Rc2 connected in series to receive a constant voltage Vd, a node between the resistors Rc and Rd1 is connected to a reference voltage terminal Vrefb of the driving circuit 32, and a switch 56 is connected in parallel to the resistor Rc2. The switch 56 is switched in response to the determination signal DS of the voltage determination unit 40. According to the determination signal DS, the switch 56 is turned on when the lighting units 20 and 22 are connected in parallel, and turned off when the lighting units 20 and 22 are connected in series.

According to the determination signal, the switch 52 of the sensing resistor circuit 64 is turned on when the lighting units 20 and 22 are connected in parallel, and turned off when the lighting units 20 and 22 are connected in series.

Hereafter, the operation of the embodiment of FIG. 13 will be described.

When the determination signal DS is provided at a low level, the connection circuit 50 provides a path between the parallel terminal P and the common terminal C to connect the lighting units 20 and 22 in parallel.

At this time, the switch 56 of the reference voltage control circuit 72 and the switch 52 of the sensing resistor circuit 64 are turned on. As a result, the reference voltages of the driving circuits 30 and 32 may be provided at the same level, and the driving circuits 30 and 32 may have the same sensing resistance value and sensing voltage through the sensing resistors Rs1 and Rs2 having the same resistance value.

Therefore, the lighting units 20 and 22 are connected in parallel to each other and sequentially light emits in response to the changes of the rectified voltage Vrec.

At this time, the driving currents of the lighting units 20 and 22 are equal to each other.

However, when the determination signal DS is provided at a high level, the connection circuit 50 provides a path between the serial terminal S and the common terminal C to connect the lighting units 20 and 22 in series. At this time, the switch 56 of the reference voltage control circuit 72 and the switch 52 of the sensing resistor circuit 64 are turned off. Thus, the reference voltage of the driving circuit 32 is raised by the added resistor Rc2, and the sensing resistance values and the sensing voltages of the driving circuits 30 and 32 are also raised by the sensing resistor Rs3 which is commonly added.

When the effect obtained by the rise of the reference voltage is larger than the effect obtained by the rise of the sensing resistance value, the driving current of the driving circuit 32 is reduced. Thus, when the lighting units 20 and 22 are connected in series, the driving currents of the driving circuits 30 and 32 are reduced more than when the lighting units 20 and 22 are connected in parallel.

On the other hand, when the effect obtained by the rise of the reference voltage is smaller than the effect obtained by the rise of the sensing resistance value, the driving current of the driving circuit 32 is increased. Thus, when the lighting units 20 and 22 are connected in series, the driving current of the driving circuit 30 is reduced more than when the lighting units 20 and 22 are connected in parallel, and the driving current of the driving circuit 32 is increased more than when the lighting units 20 and 22 are connected in parallel.

When the lighting units 20 and 22 are connected in series, the entire LED groups LED1 to LED8 in the embodiment of FIG. 13 sequentially emit light.

In the present embodiment, the higher between the first and second rectified voltages for dividing the rectified voltage Vrec may be set to the double of the lower. However, when the first and second rectified voltages are set to 120V and 277V, respectively, the second rectified voltage may have a voltage margin of 37V in consideration of the first rectified voltage. Thus, in order to remove the voltage margin, one or more LEDs may be further implemented.

For this configuration, the lighting apparatus according to the present embodiment may further include one or more of one or more first LEDs which are connected to the lighting unit 20 and emit light at a lower priority than the lighting unit 20 and one or more second LEDs which are connected to the lighting unit 22 and emit light at a lower priority than the lighting unit 22, and one or more of the first LEDs and the second LEDs may emit light when the lighting units 20 and 22 are connected in series.

Figure 14:
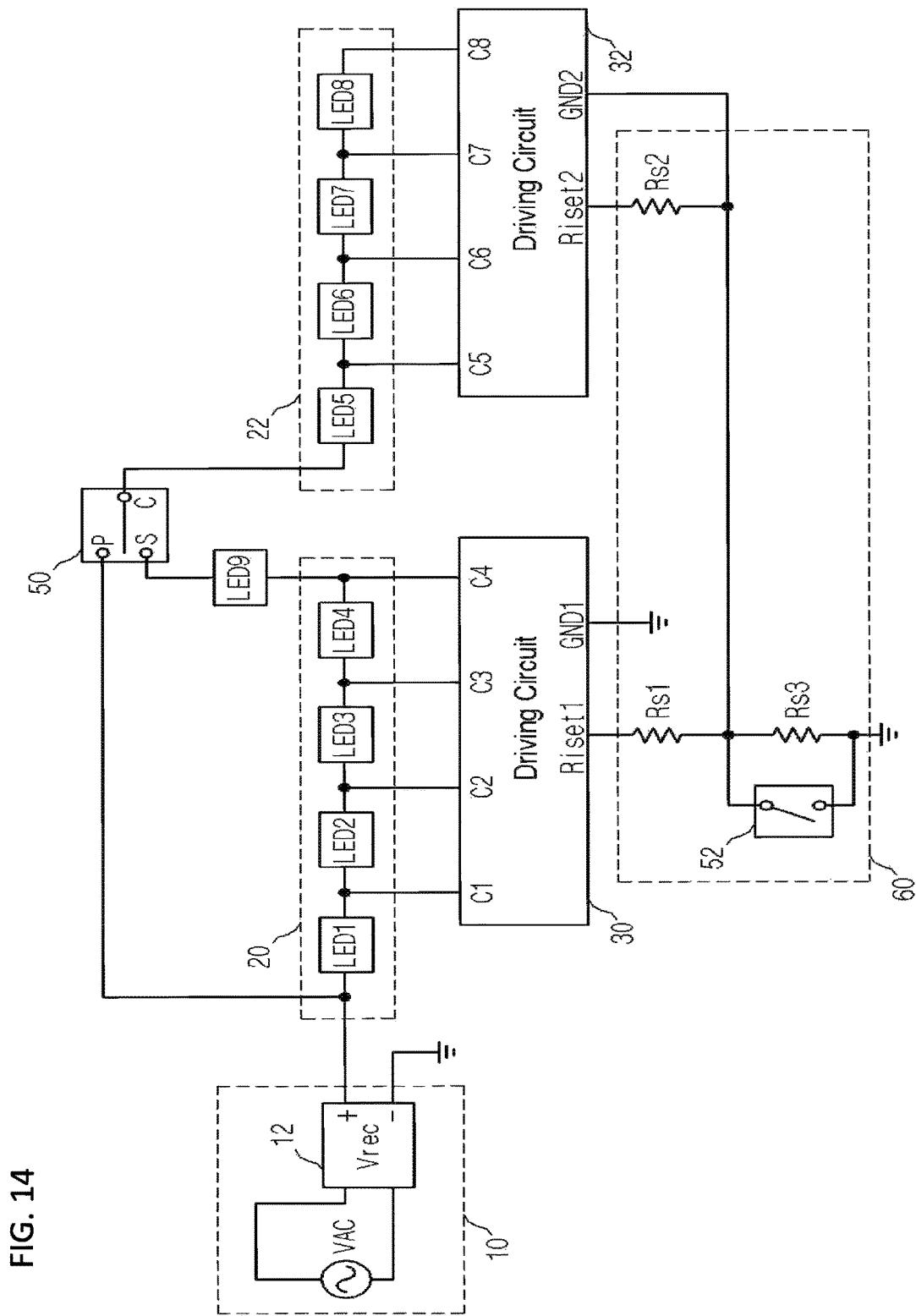
FIG. 14 is a block diagram illustrating a lighting apparatus according to another embodiment of the present invention.

The above-described embodiment may be configured as illustrated in FIG. 14.

In the embodiment of FIG. 14, an LED group LED9 may be connected in series to the lighting unit 20, and emit light at a lower priority than the lighting unit 20. In FIG. 14, the other components are configured in the same manner as FIG. 1. Thus, the duplicated descriptions thereof are omitted herein.

In the embodiment of FIG. 14, when the lighting units 20 and 22 are connected in parallel in response to the first rectified voltage, the LED group LED9 does not emit light according to the level of the first rectified voltage.

On the other hand, when the lighting units 20 and 22 are connected in series in response to the second rectified voltage, the LED groups LED1 to LED9 sequentially emit light. At this time, the LED group LED9 and the LED group LED5 may be connected in series, and emit light at the same time.

For example, when the first rectified voltage is set to 120V and the second rectified voltage is set to 277V, the LED group LED9 may include one or more LEDs capable of covering 37V.

As described above, the lighting apparatus according to the present embodiments can control the serial/parallel connection between the lighting units 20 and in response to the state of the rectified voltage Vrec. Thus, the lighting apparatus can have the universality for the electric power environment.

While various embodiments have been described above, it will be understood to those skilled in the art that the embodiments described are by way of example only. Accordingly, the disclosure described herein should not be limited based on the described embodiments.

What is claimed is:

1. A lighting apparatus comprising:
   first and second lighting units comprising one or more LEDs, configured to emit light in response to a rectified voltage, and connected in series or parallel to each other;
   a first driving circuit configured to provide a first current path corresponding to light emission of the first lighting unit, and regulate a first driving current of the first current path by comparing first reference voltages to a first sensing voltage of a first sensing resistor connected to the first current path;
   a second driving circuit configured to provide a second current path corresponding to light emission of the second lighting unit, and regulate a second driving current of the second current path by comparing second reference voltages to a second sensing voltage of a second sensing resistor connected to the second current path;
   a driving current control circuit including a third sensing resistor connected in serial to the first sensing resistor and a second switch connected in parallel to the third sensing resistor and configured to increase the first sensing voltage by controlling the second switch in order to reduce the first driving current when the first and second lighting units connect in series and the first lighting unit first emits light; and
   a first switch configured to change the electrical serial or parallel connection between the first and second lighting units;
   wherein the first and second lighting units emit light in response to the rectified voltage which is divided into first and second rectified voltages having different representative values, and are connected in parallel to each other in response to the first rectified voltage or connected in series to each other in response to the second rectified voltage higher than the first rectified voltage.

2. The lighting apparatus of claim 1, further comprising:
the first switch configured to manually change the electrical serial or parallel connection between the first and second lighting units.

3. The lighting apparatus of claim 1, further comprising a voltage determination unit configured to divide the rectified voltage into the first and second rectified voltages having different representative values, and provide a determination signal obtained by dividing the rectified voltage,
wherein the first and second lighting units are connected in parallel or series according to the determination signal.

4. The lighting apparatus of claim 3, further comprising a connection circuit configured to electrically connect the first and second lighting units in series or parallel in response to the determination signal,
wherein the driving current control circuit reduces the first driving current by increasing the first sensing voltage in response to the determination signal.

5. The lighting apparatus of claim 3, wherein the voltage determination unit generates the representative value of the rectified voltage for dividing the rectified voltage into the first and second rectified voltages, and the representative value corresponds to any one of the state of the rectified voltage during a half cycle or more, the peak value of the rectified voltage, the average value of the rectified voltage, and the average value of input current.

6. The lighting apparatus of claim 5, wherein the voltage determination unit determines the representative value according to a preset reference level in order to divide the rectified voltage into the first and second voltages, and the reference level is set in the range of 1.1 to 2.6 times the lower level between the first and second rectified voltages.

7. The lighting apparatus of claim 1, wherein the driving current control circuit reduces the first driving current such that the higher power consumption between first power consumption caused by the first driving current and second power consumption caused by the second driving current is formed in the range of 0.5 to 1.5 times the lower power consumption.

8. The lighting apparatus of claim 1, wherein the driving current control circuit reduces the first driving current by increasing the first sensing voltages and increases the second driving current by increasing the second reference voltages when the first and second lighting units connect in series.

9. The lighting apparatus of claim 1, wherein a second sensing resistance value of the second resistor is fixed.

10. The lighting apparatus of claim 1, wherein the driving current control circuit comprises a switch connected to the first and second sensing resistors in common and a third sensing resistor connected in parallel to the switch and changes the first and second driving currents by controlling the switch.

11. The lighting apparatus of claim 1, wherein when the first lighting unit has X channels which sequentially emit light, the second lighting unit has Y channels which sequentially emit light, and the first and second lighting units are connected in series where X and Y are natural numbers, the total number of channels which are divided by the amount of driving current in response to sequential light emission is equal to or more than the larger between X and Y.

12. The lighting apparatus of claim 1, further comprising one or more first LEDs connected to the first lighting unit in series and configured to emit light later than the first lighting unit,
wherein the one or more first LEDs emit light when the first and second lighting units are connected in series.

13. The lighting apparatus of claim 1, wherein the first and second driving circuits are implemented as one integrated circuit.

14. The lighting apparatus of claim 10, wherein the second sensing resistor is connected between a sensing resistor terminal and a ground terminal of the second driving circuit and provides a fixed resistance value and the second sensing voltage corresponding to the fixed resistance value.

15. The lighting apparatus of claim 10, further comprising a voltage determination unit configured to provide a determination signal obtained by dividing the rectified voltage,
wherein the switch is controlled by the determination signal.

16. A lighting apparatus comprising:
first and second lighting units comprising one or more LEDs, configured to emit light in response to a rectified voltage, and connected in series or parallel to each other;
a first driving circuit configured to provide a first current path corresponding to light emission of the first lighting unit and regulate a first driving current of the first current path by comparing first reference voltages to a first sensing voltage of a first sensing resistor connected to the first current path;
a second driving circuit configured to provide a second current path corresponding to light emission of the second lighting unit and regulate a second driving current of the second current path by comparing second reference voltages to a second sensing voltage of a second sensing resistor connected to the second current path;
a driving current control circuit including a second switch connected in parallel to a resistor providing a reference voltage and configured to reduce the first reference voltages by controlling the second switch in order to reduce the first driving current when the first and second lighting units connect in series and the first lighting unit first emits light; and
a first switch configured to change the electrical serial or parallel connection between the first and second lighting units;
wherein the first and second lighting units emit light in response to the rectified voltage which is divided into first and second rectified voltages having different representative values, and are connected in parallel to each other in response to the first rectified voltage or connected in series to each other in response to the second rectified voltage higher than the first rectified voltage.

17. The lighting apparatus of claim 16, further comprising a voltage determination unit configured to provide a determination signal obtained by dividing the rectified voltage into the first and second rectified voltages having different representative values and a connection circuit configured to electrically connect the first and second lighting units in series or parallel in response to the determination signal.

18. The lighting apparatus of claim 17, wherein the driving current control circuit reduces the first driving current by reducing the first reference voltages in response to the determination signal.

* * * * *